(12) United States Patent
Matsumoto et al.

(10) Patent No.: US 6,361,401 B1
(45) Date of Patent: Mar. 26, 2002

(54) PHASE ADJUSTING METHOD AND RECESS MACHINING APPARATUS AND METHOD

(75) Inventors: Yasutami Matsumoto; Tohru Sakaguchi, both of Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/895,270

(22) Filed: Jul. 2, 2001

Related U.S. Application Data

(62) Division of application No. 09/459,567, filed on Dec. 13, 1999, now Pat. No. 6,277,004.

(30) Foreign Application Priority Data

Dec. 11, 1998 (JP) ............................................. 10-352880

(51) Int. Cl.[7] .............................................. B24B 49/00
(52) U.S. Cl. ................................. 451/8; 451/11; 451/5
(58) Field of Search ........................... 451/8, 9, 10, 11, 451/6, 70, 120, 127, 139, 150, 164, 166, 5

(56) References Cited

U.S. PATENT DOCUMENTS

| | | |
|---|---|---|
| 4,735,019 A | 4/1988 | Wiederkehr |
| 5,197,228 A | 3/1993 | Sharkey, III et al. |
| 5,645,466 A | 7/1997 | Wikle |
| 5,895,311 A | 4/1999 | Shiotani et al. |
| 6,106,366 A | 8/2000 | Dixon et al. |

Primary Examiner—Timothy V. Eley
Assistant Examiner—Dung Van Nguyen
(74) Attorney, Agent, or Firm—Sughrue Mion, PLLC

(57) ABSTRACT

The phase adjusting method is a method for holding a work including an end face formed symmetrical with respect to the axis of the work and a plurality of recesses respectively formed in a concave manner from the end face and also for positioning the position of each of the recesses around the axis of the work. Specifically, in the phase adjusting method, while holding the work in such a manner that it can be rotated around the axis thereof, the position of each of the recesses around the axis is detected. In accordance with the thus detected position of the recess around the axis, there is obtained a rotation angle by which the work is rotated around the axis thereof in such a manner the recess can be positioned at a given position around the axis of the work. And, based on the thus obtained rotation angle, the work is rotated around the axis thereof to position the recess at a given position around the axis of the work to thereby position the work.

9 Claims, 10 Drawing Sheets

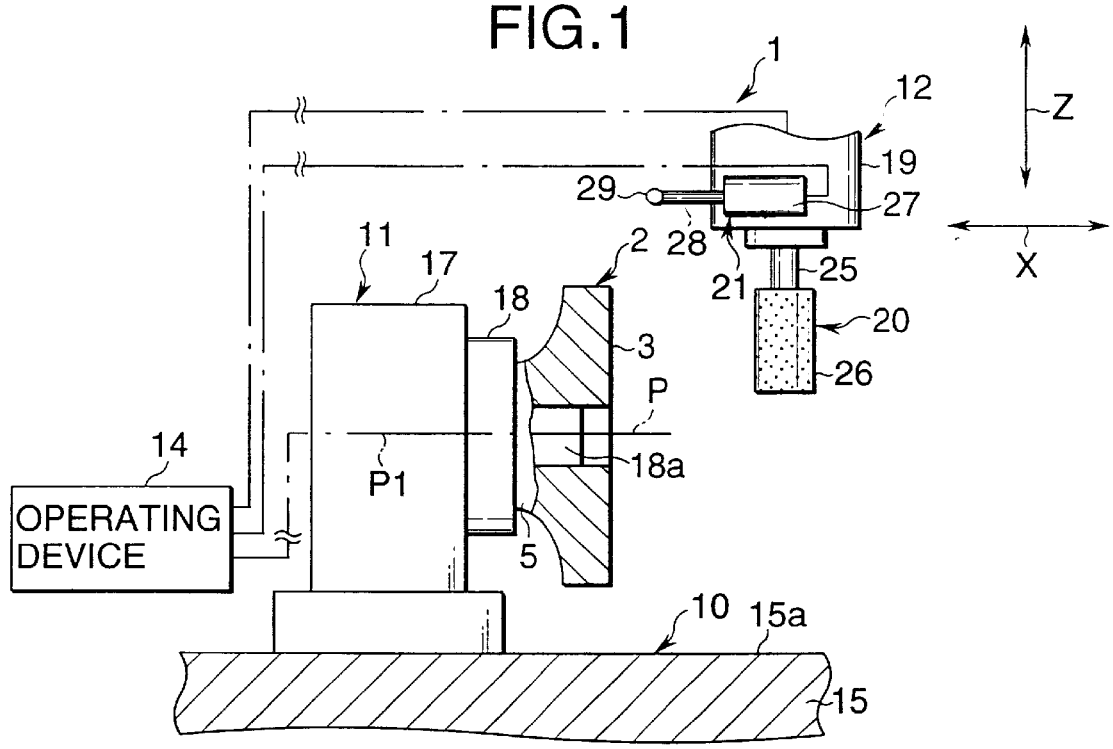
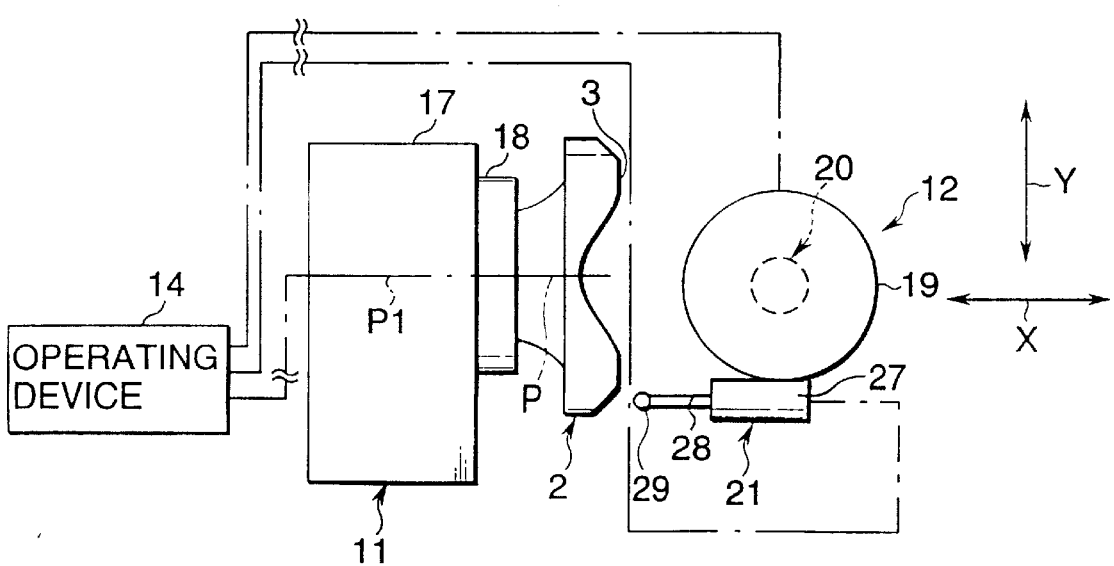

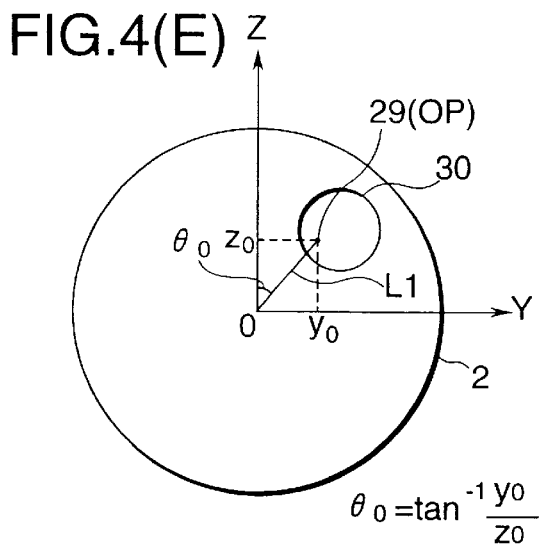
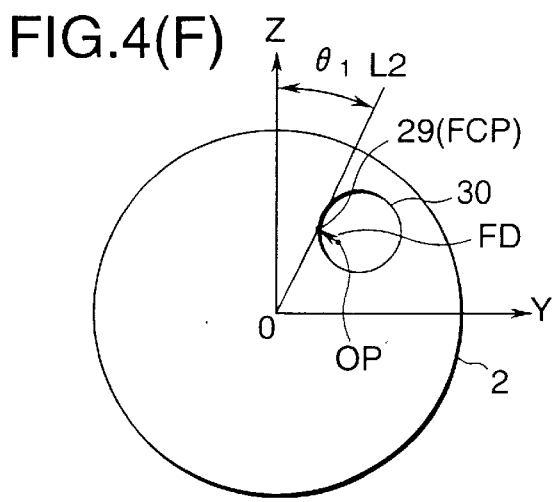
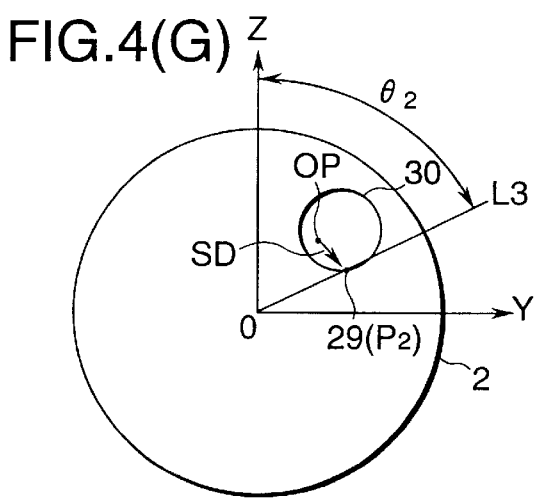
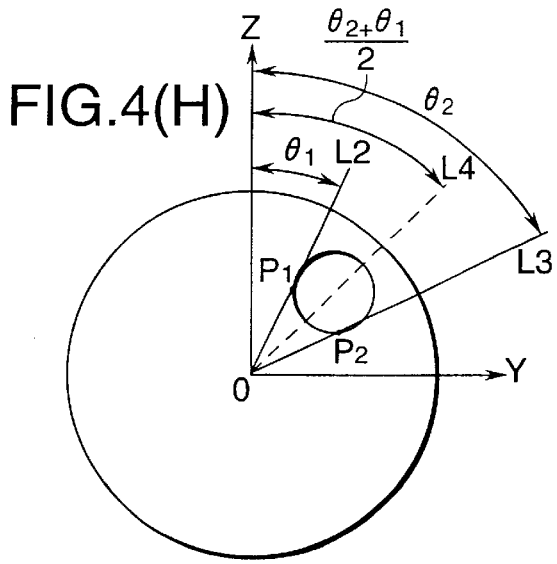
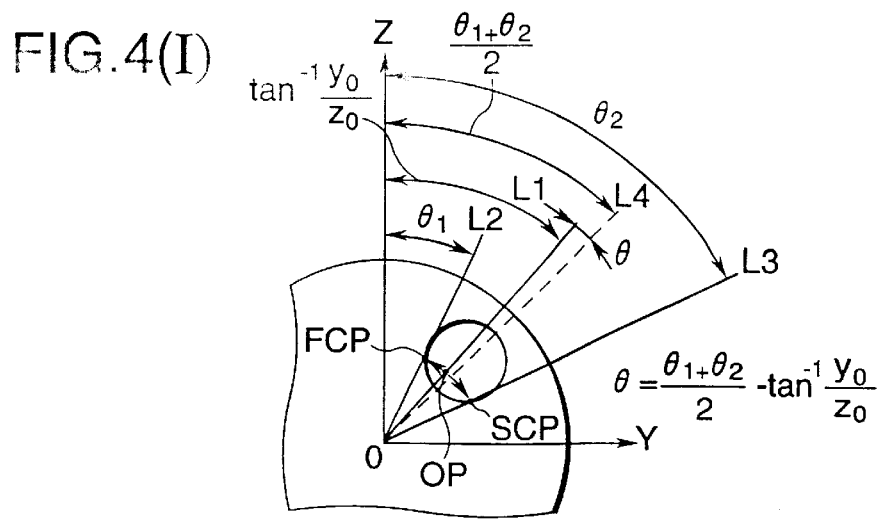

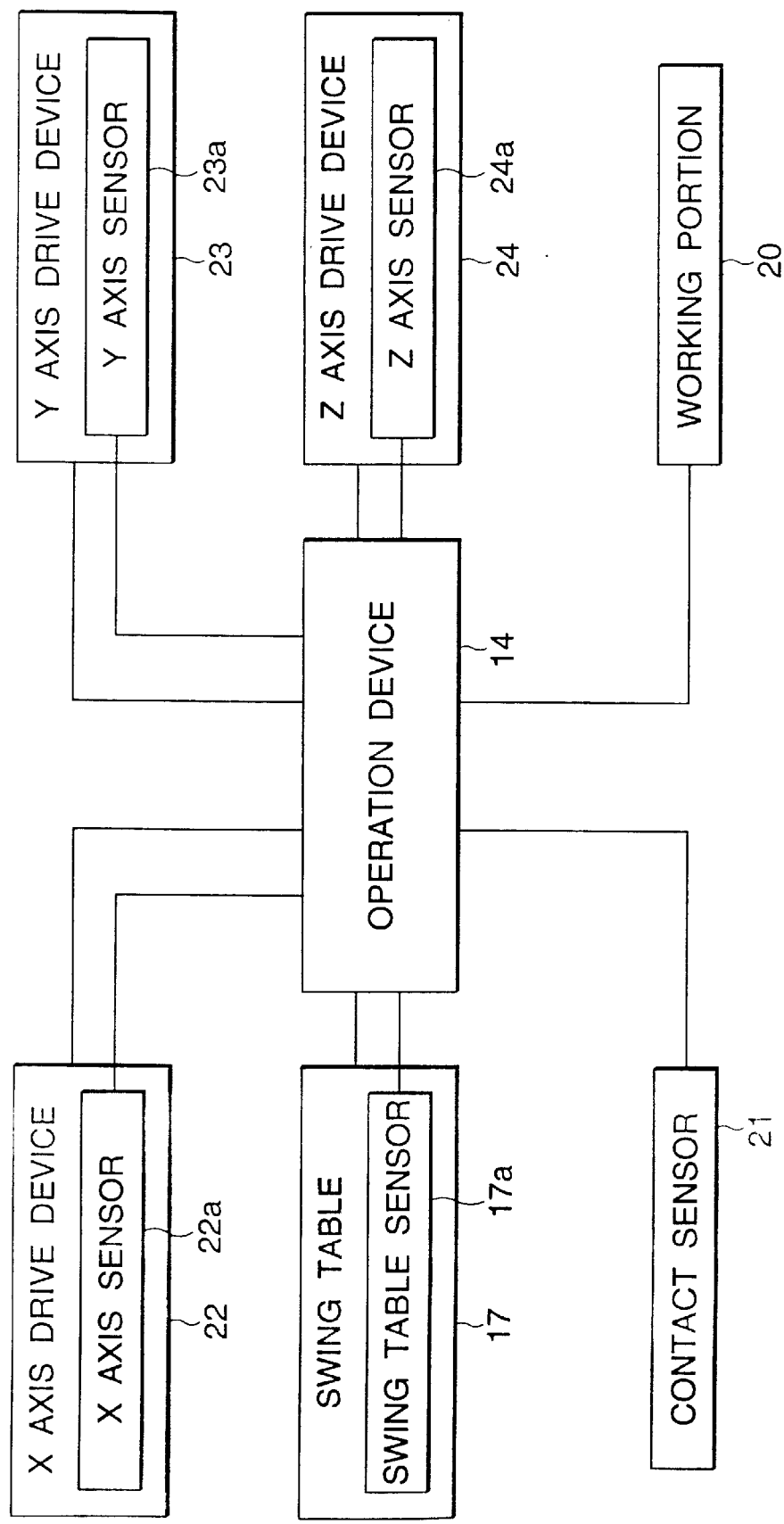

PHASE ADJUSTING METHOD AND RECESS MACHINING APPARATUS AND METHOD

This is a divisional of Application No. 09/459,567 filed Dec. 13, 1999 now U.S. Pat. No. 6,277,004, is incorporated herein by reference.

BACKGROUND OF THE INVENTION

The present invention relates to a phase adjusting method which, in a work with a recess formed around the axis of the work, positions the recess around the axis of the work. In addition, the present invention also relates to a recess machining apparatus and method for producing a work with a recess formed around its axis in which the recess of the work can be accurately positioned and then machined.

For example, a loading cam mechanism of a troidal-type continuously variable transmission used as a transmission for a car includes a cam disk and a roller. The cam disk is formed in a disk shape which is symmetric with respect to the axis of the cam disk. Also, the cam disk includes an end face, which is formed symmetric with respect to the above-mentioned axis and extends in a flat manner along a direction meeting at right angles to the above-mentioned axis, and a plurality of cam surfaces each of which has a concave shape extending from the end face and is formed at positions spaced at equal intervals along the peripheral direction of the cam disk.

Each of the cam surfaces includes a pair of inclined surfaces respectively formed inclined with respect to the end face of the cam disk and opposed to each other, and an arc surface connecting the pair of inclined surfaces to each other.

To manufacture a work such as the above-mentioned cam disk which includes an end face formed symmetric with respect to the axis of the work and a plurality of cam surfaces respectively formed in a concave manner from the end face of the work and arranged at equal intervals along the peripheral direction of the work, normally, there is employed a manufacturing method which comprises the following two steps: that is, one is a rough machining step in which a cylindrical-shaped blank member is forged or cut to thereby produce once an intermediate product close in shape to the above-mentioned cam disk; and, the other is a finishing step in which a grinding operation or a similar finishing operation is executed on the thus produced intermediate product to thereby obtain a cam disk having a final shape.

The intermediate product 62 (which is hereinafter referred to as a work) obtained through the rough working step, as shown in FIG. 13 and in other figures, is formed in a disk shape which is symmetric with respect to the axis P2 thereof. The work 62 includes an end face 63, which is formed symmetric with respect to the axis P2 and extends in a flat manner along a direction meeting at right angles to the axis P2, and aplurality of recesses 64 which are respectively formed in a concave manner and are disposed at equal intervals along the peripheral direction of the work 62. By the way, these recesses 64 correspond to the above-mentioned cam surfaces.

When carrying out a grinding operation or a similar finishing operation on the work 62 obtained through the rough working step, it is necessary to position a tool such as a grindstone or the like at a position which corresponds to the above-mentioned recesses 64. For this reason, a proper position relationship between the recesses 64 and tool must be maintained by using means which can position or set the position of the recesses 64 around the axis P2 at a given position.

Conventionally, in carrying out a grinding operation or a similar finishing operation on the above-mentioned work 62, to keep a proper position relationship between the recesses 64 and tool, an operator positions the tool such as a grindstone or the like by hand in such a manner that it is contacted with the bottom 64a of the currently required one of the recesses 64. An operation to position the recess 64 and tool in this manner not only demands skill from the operator but also is liable to lower the positioning accuracy of the work 62 around the axis P2. Further, such positioning operation provides a low operation efficiency and is thus liable to increase the manufacturing cost of the work 62.

As the means for positioning the position of each of the recesses 64 around the axis P2 at a given position, it can be expected to use a positioning jig. A positioning jig of this type includes a projection which can be engaged with and matched to any one of the recesses 64. That is, when using such positioning jig, the projection thereof is engaged with and matched to the specific one of the recesses 64 to thereby position the work 62. However, a phase adjusting method using this type of positioning jig is found that it is liable to lower the positioning accuracy of the work 62 around the axis P2; for example, the positioning accuracy of the work 62 around the axis P2 is easy to vary.

SUMMARY OF THE INVENTION

The present invention aims at eliminating the drawbacks found in the above-mentioned conventional phase adjusting method.

Accordingly, it is an object of the invention to provide a phase adjusting method which is able to position each of the recesses of the work around the axis of the work with high accuracy and also to restrict an increase in the manufacturing cost of the work. In addition, it is also an object of the present invention to provide a recess machining apparatus and method for producing a work with a recess formed around its axis with high accuracy and also for restricting an increase in the manufacturing cost of the work.

In attaining the above object, according to the invention, there is provided a phase adjusting method for holding a work with a recess formed around the axis of the work and for positioning the position of the recess around the axis, the method comprising the steps of: holding the work in such a manner that it can be rotated around the axis of the work; detecting the position of the recess around the axis of the work; finding a rotation angle around the axis for positioning the recess at a given position around the axis of the work in accordance with the thus detected position of the recess around the axis of the work; and, rotating the work around the axis thereof in accordance with the thus found rotation angle to thereby position the recess at a given position around the axis of the work.

The above object can be achieved by a phase adjusting method for holding a work with a recess formed around the axis of the work and for positioning the recess around the axis at a predetermined rotational angular position, the method according to the present invention comprising the steps of:

holding the work;
detecting an initial angular position of a detecting point of the work at which a contact sensor is brought in contact with the work;
rotating the work in a first direction until the detecting point reaches a first angular position;
reverse-rotating the work in a second direction opposite to the first direction until the detecting point reaches a second angular position;

calculating an detected angular position on the basis of first and second angular positions and then calculating a rotation angle corresponding to a difference between the initial angular position and the detected angular position; and adjusting a phase of the recess into a predetermined angular position by rotating the work around the axis in accordance with the rotation angle thus calculated.

In the phase adjusting method according to present invention, it is preferable that the angular position is an averaged angular position of the first and second angular positions. In addition, in the phase adjusting method according to present invention, it is preferable to further comprise the steps of:

supplementally sensing a detecting point before the detecting step but after the holding step, and rotating the work by 180 degree so as to conduct the detecting step.

Further, the above object can also be attained by a recess machining apparatus for manufacturing a work with recesses disposed in a circumferential direction at a predetermined interval, the recess machining happaratus according to the present invention comprising:

a holding and rotating member by which a work can be held at any angular positions and the work can be rotated around its axis;

a machining unit having a tool by which the recesses of the work can be finally machined;

three dimensional drive unit for driving the machining unit in a X direction horizontally extended along the axis of the work, a Y direction vertically extended along a line perpendicular to the X direction and a Z direction horizontally extended along a line perpendicular to the X and Y directions;

table sensor detecting an angular position of the work about the axis of the work;

position sensors respectively detecting positions of the machining unit in the X, Y and Z directions;

a contact sensor provided with the tool while keeping a predetermined positional relationship between the contact sensor and the tool; and a phase controller for controlling and adjusting a positional relationship between the tool and an angular position of the recess, wherein the phase controller brings the contact sensor into contact with a detecting point of the work and then stores an initial angular position of the detecting point at this time, the phase controller rotates the work in a first direction by a first rotational angular distance and then stores a first data, the phase controller reverse-rotates the work in a second direction opposite to the first direction by a second rotational angular distance and then stores a second data, the phase controller calculates an detected angular position on the basis of first and second angular positions and then calculates a rotation angle corresponding to a difference between the initial angular position and the detected position, and the phase controller adjusts the recess into a predetermined angular position by rotating the work around the axis in accordance with the rotation angle thus calculated.

In the recess machining apparatus, it is advantageous that the first data is a first angular position of the detecting point of the work, the second data is a second angular position of the detecting point of the work, and the phase controller calculates the rotation angle which corresponds to a difference between an averaged angular position of the first and second angular positions.

In the recess machining apparatus, it is advantageous that the work has a positional hole which is disposed apart from the recess by a predetermined distance, the first angular position is defined by an angle between a line which extends in the Z direction and contains the axis of the work and a line which is formed by connecting the axis of the work and a first contact position where the inner surface of the positional hole and the positional sensor are brought in contact with each other when the work rotates in the first direction, and the second angular position is defined by an angle between a line which extends in the Z direction and contains the axis of the work and a line which is formed by connecting the axis of the work and a second contact position where the inner surface of the positional hole and the positional sensor are brought in contact with each other when the work rotates in the second direction.

In the above mentioned recess machining apparatus, it may further comprise:

a supplemental sensor which is provided with the contact sensor and disposed at a position apart from the contact sensor by an angle of 180 degree about the axis of the work.

Moreover, in the recess machining apparatus, it is preferable that each of the recesses is substantially formed into a symmetrical V-shape defined by first and second inclined lines in a cross-section, the first predetermined rotational angular distance is equal to the second predetermined rotational angular distance, the contact sensor is brought in contact with a point of the work which is contained in its predetermined pitch circle, the first data is a first height of a first detecting point on the first inclined line, in the X direction detected by the X direction position sensor, the first detecting point being a point at which the first inclined line and the contact sensor are contacted with each other when the work is rotated in the first direction, and the second data is a second height of a second detecting point on the second inclined line, in the X direction detected by the X direction position sensor, the second detecting point being a point at which the second inclined line and the contact sensor are contacted with each other when the work is rotated in the second direction.

The above object can further be achieved by recess machining method for manufacturing a work with recesses disposed in a circumferential direction at a predetermined interval, in a recess machining apparatus comprising a holding and rotating member by which a work can be held at any angular positions and the work can be rotated around its axis, a machining unit having a tool by which the recesses of the work can be finally machined, three dimensional drive unit for driving the machining unit in a X direction horizontally extended along the axis of the work, a Y direction vertically extended along a line perpendicular to the X direction and a Z direction horizontally extended along a line perpendicular to the X and Y directions, a table sensor detecting an angular position about the axis of the work, position sensors respectively detect positions of the machining unit in the X, Y and Z directions, a contact sensor provided with the tool while keeping a predetermined positional relationship between the contact sensor and the tool, and a phase controller for controlling and adjusting a positional relationship between the tool and an angular position of the recess, the recess machining method according to the present invention comprising the steps of:

bringing the contact sensor into contact with a detecting point of the work and then storing an initial angular position of the recess at this time, detecting the initial angular position of a detecting point of the work at which a contact sensor is brought in contact with the work rotating the work in a first direction by a first rotational angular distance and then storing a first data at this time, reverse-rotating the work in a second direction opposite to the first direction by a second rotational angular distance and then storing a second data at this time, calculating a detected angular position of the detecting point of the work on the basis of first and second data and then calculating a rotation angle corresponding to a difference between the initial angular position and the detected angular position, and adjusting the recess into the predetermined angular position by rotating the work around the axis in accordance with the rotation angle thus calculated.

In the recess machining method, it is preferable that the first data is a first angular position of the work, the second data is a second angular position of the work, and the phase controller calculates the rotation angle which corresponds to a difference between an averaged angular position of the first and second angular positions.

Further, in the recess machining method, it is preferable that the work has a positional hole which is disposed apart from the recess by a predetermined distance, the first angular position is defined by an angle between a line which extends in the Z direction and contains the axis of the work and a line which is formed by connecting the axis of the work and a first contact position where the inner surface of the positional hole and the positional sensor are brought in contact with each other when the work rotates in the first direction, and the second angular position is defined by an angle between a line which extends in the Z direction and contains the axis of the work and a line which is formed by connecting the axis of the work and a second contact position where the inner surface of the positional hole and the positional sensor are brought in contact with each other when the work rotates in the second direction.

Furthermore, in the recess machining method, it is preferable to further comprises the step of:

preliminary detecting a phase of the recess with a supplemental contact sensor which is provided with the contact sensor and disposed at a position apart from the contact sensor by an angle of 180 degree about the axis of the work.

Moreover, in the recess machining method, it is also advantageous that each of the recesses is substantially formed into a symmetrical V-shape defined by first and second inclined lines in a cross-section, the first predetermined rotational angular distance is equal to the second predetermined rotational angular distance, the contact sensor is brought in contact with a detecting point of the work which is contained in its predetermined pitch circle, the first data is a first height of a first detecting point on the first inclined line, in the X direction detected by the X direction position sensor, the first detecting point being a point at which the first inclined line and the contact sensor are contacted with each other when the work is rotated in the first direction, and the second data is a second height of a second detecting point on the second inclined line, in the X direction detected by the X direction position sensor, the second detecting point being a point at which the second inclined line and the contact sensor are contacted with each other when the work is rotated in the second direction.

According to the present phase adjusting method and the present recess machining apparatus and method, the work is held in such a manner that it can be rotated around the axis thereof, the position of the recess around the axis of the work is detected and, in accordance with the thus detected recess position, there is obtained a rotation angle which is used to position the recess at a given position. And, in accordance with the thus obtained rotation angle, the work is rotated around the axis thereof and is thereby positioned. Thanks to these methods and apparatus, the work can be positioned around the axis thereof with high accuracy.

Also, due to the fact that, based on the detected position of the recess, there is obtained the above-mentioned rotation angle and, based on this rotation angle, the work is rotated around the axis thereof and is thereby positioned, an operation to position the work can be automated. This makes it possible to restrict an increase in the production cost of the work and the like.

The above object can be achieved by a recess machining apparatus for manufacturing a work with recesses disposed in a circumferential direction at a predetermined interval, said recess machining apparatus comprising:

a holding and rotating member by which a work can be held at any angular positions and work can be rotated around its axis;

a machining unit having a tool by which recesses of work can be finally machined;

three dimensional drive unit for driving relatively machining unit and holding and rotating member in a X direction horizontally extended along the axis of work, a Y direction vertically extended along a line perpendicular to X direction and a Z direction horizontally extended along a line perpendicular to X and Y directions;

table sensor detecting an angular position of work about the axis of work;

position sensors respectively detecting positions of the machining unit in the X, Y and Z directions;

a contact sensor provided with tool while keeping a predetermined positional relationship between contact sensor and tool; and a phase controller for controlling and adjusting a positional relationship between tool and an angular position of recess, wherein each of recesses is substantially formed into a symmetrical V-shape defined by first and second inclined lines in a cross-section, first predetermined rotational angular distance is equal to second predetermined rotational angular distance, contact sensor is brought in contact with a point of work which is contained in its predetermined pitch circle, first data is a first height of a first detecting point on first inclined line, in the X direction detected by X direction position sensor, first detecting point being a point at which first inclined line and contact sensor are contacted with each other when work is rotated in the first direction, and.

second data is a second height of a second detecting point on second inclined line, in the X direction detected by X direction position sensor, second detecting point being a point at which second inclined line and contact sensor are contacted with each other when work is rotated in the second direction, and phase controller determines a reference angular position of table sensor on the basis of first predetermined rotation angular distance, first data and second data.

In addition, the above-mentioned object can further be attained by a recess machining method for manufacturing a work with recesses disposed in a circumferential direction at a predetermined interval, in a recess machining apparatus comprising a holding and rotating member by which a work can be held at any angular positions and work can be rotated around its axis, a machining unit having a tool by which recesses of work can be finally machined, three dimensional drive unit for driving relatively machining unit and holding and rotating member in a X direction horizontally extended along the axis of work, a Y direction vertically extended along a line perpendicular to X direction and a Z direction horizontally extended along a line perpendicular to X and Y directions, a table sensor detecting an angular position about the axis of work, position sensors respectively detect positions of the machining unit in the X, Y and Z directions, a contact sensor provided with tool while keeping a predetermined positional relationship between contact sensor and tool, and a phase controller for controlling and adjusting a positional relationship between tool and an angular position of recess, recess machining method comprising the steps of:

bringing contact sensor into contact with a detecting point of work and then storing an initial angular position of recess at this time, detecting initial angular position of a detecting point of work at which a contact sensor is brought in contact with work rotating work in a first direction by a first rotational angular distance and then storing a first data at this time, reverse-rotating work in a second direction opposite to first direction by a second rotational angular distance and then storing a second data at this time, calculating an detected angular position of detecting point of the work on the basis of first and second data and then calculating a rotation angle corresponding to a difference between initial angular position and detected angular position, and adjusting recess into predetermined angular position by rotating work around axis in accordance with rotation angle thus calculated, wherein each of recesses is substantially formed into a symmetrical V-shape defined by first and second inclined lines in a cross-section, first predetermined rotational angular distance is equal to second predetermined rotational angular distance, contact sensor is brought in contact with a detecting point of work which is contained in its predetermined pitch circle, first data is a first height of a first detecting point on first inclined line, in the X direction detected by X direction position sensor, first detecting point being a point at which first inclined line and contact sensor are contacted with each other when work is rotated in the first direction, and second data is a second height of a second detecting point on second inclined line, in the X direction detected by X direction position sensor, second detecting point being a point at which second inclined line and contact sensor are contacted with each other when work is rotated in the second direction, and phase controller determines a reference angular position of table sensor on the basis of first predetermined rotation angular distance, first data and second data.

BRIEF DESCRIPTION OF THE DRAWINGS

FIG. 1 is a side view of the structure of a machine tool according to a first embodiment of the invention;

FIG. 2 is a plan view of the structure of the machine tool according to the first embodiment;

FIGS. 4(A)–4(I) show an explanatory view of a process in which the work is positioned by the machine tool according to the first embodiment;

FIG. 5 is a block diagram of the structure of the machine tool according to the first embodiment;

DETAILED DESCRIPTION OF THE PREFERRED EMBODIMENTS

Now, description will be given below of a first embodiment of a phase adjusting method according to the invention with reference to FIGS. 1 through 5, and FIGS. 11 and 12.

Figure 3:
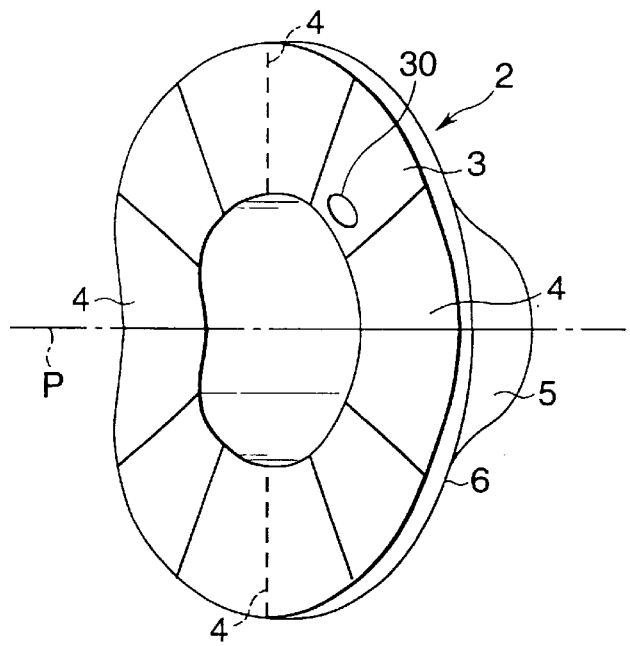
FIG. 3 is a perspective view of a work to be worked by the machine tool according to the first embodiment.

A machine tool 1, which is shown in FIG. 1 and in other figures, is an apparatus which executes a grinding operation or a similar working operation on a work 2 formed so as to be symmetric with respect to an axis P thereof shown in FIG. 3 or in other figures to thereby produce a product such as a cam disk or the like for use in a troidal-type continuously variable transmission. In the present embodiment, as the work 2, there is illustrated an intermediate product which is obtained in an intermediate step in a manufacturing method for manufacturing a cam disk for use in a loading cam mechanism employed in a troidal-type continuously variable transmission.

To manufacture a cam disk for use in a loading cam mechanism employed in a troidal-type continuously variable transmission, for example, there is employed a manufacturing method which comprises two working steps: that is, one of them is a rough working step of forging or cutting a cylindrical blank member to thereby manufacture once an intermediate product close in shape to a cam disk as a final product; and, the other is a finishing step of grinding the intermediate product to thereby provide a product having a final shape, that is, a cam disk.

The above-mentioned cam disk has a shape which is formed symmetric with respect to the axis thereof. For this reason, the intermediate product (which is hereinafter referred to as a work) obtained in the intermediate step in the manufacturing method for manufacturing the final product or cam disk, as shown in FIG. 3 and in other figures, is formed so as to be symmetric with respect to the axis P of the work 2.

The work 2 is formed in a disk shape which is symmetric with respect to the axis P. Specifically, the work 2 comprises a projecting portion 5 which projects along the axis P, a skirt portion which extends from the projecting portion 5 in such a manner that it gradually decreases in thickness toward the outer peripheral direction of the work 2, an end face 3 which is situated on the back side of the projecting portion 5, and a plurality of recesses 4 which are respectively formed in the end face 3 and arranged at regular intervals along the peripheral direction of the end face 3, while the recesses 4 correspond to cam surfaces 104 formed in a cam disk 102 (shown in FIG. 12 and in other figures).

The end face 3 is formed in a fan shape which is symmetric with respect to the axis P and has the axis P as the center thereof. The end face 3 is also formed so as to extend in a flat manner along a direction meeting at right angles to the axis P. The plurality of recesses 4 are respectively disposed at positions which are arranged around the axis P at regular intervals along the peripheral direction of the end face 3. In particular, in the illustrated embodiment, four recesses 4 are formed around the axis P at regular intervals in the peripheral direction of the end face 3.

Each of the four recesses 4 includes a pair of inclined surfaces 7 and 8 which are formed inclined with respect to the end face 3 and are disposed opposed to each other, and an arc-shaped arc surface 9 connecting the pair of inclined surfaces 7 and 8 to each other.

Figure 12:
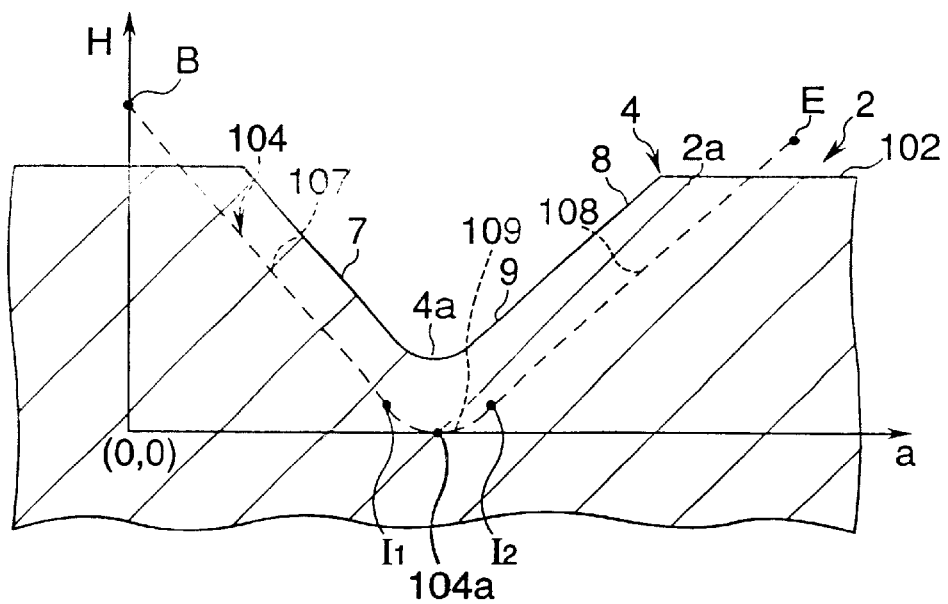
FIG. 12 is a partially enlarged section view of a work to be worked by a machine tool according to the invention.

The inclined surfaces 7 and 8 and arc surface 9 of the work 2, as shown in FIG. 12 and in other figures, are respectively formed along inclined surfaces 107 and 108 and an arc surface 109 which cooperate together in forming the cam surface 104 of a cam disk 102 as a product having a final shape. By the way, the arc surface 109 of the cam surface 104 of the cam disk 102 is formed in such a manner that it has a radius of curvature corresponding to the radius of a roller employed in the loading cam mechanism of a troidal-type continuously variable transmission.

The work 2, as shown in FIG. 12 and in other figures, includes in each recess 4a machining allowance 2a which can be cut away when a grinding operation or a similar working operation is executed on the work 2. In the recess 4, the surface of the machining allowance 2a provides the above-mentioned inclined surfaces 7, 8 and arc surface 9. Also, in the grinding operation or the like, if the machining allowance 2a is cut away, then the cam surface 104, that is, the inclined surfaces 7, 8 and arc surface 9 are respectively exposed.

In the finishing step, when carrying out the grinding operation on the work 2, it is necessary that a tool such as a grindstone or the like is positioned at a given position with respect to the recess 4 before the cam surface 104 is worked or ground by the tool. For this reason, it is necessary that the position of the recess 4 around the axis P is detected and the recess 4 is positioned at a given position around the axis P to thereby match the phase of the work 2 to the grinding tool.

Now, the above-mentioned machine tool 1 for working the work 2, as shown in FIGS. 1 and 2, comprises a tool main body 10, a rotary table 11, a working unit 12 serving as a grinding spindle device, an operation device 14 serving as control means, and the like.

The tool main body 10 includes a table portion 15 having a flat surface 15a which is formed substantially flat. The rotary table 11 is disposed on the flat surface 15a of the table portion 15, and comprises a swing table 17 including a drive device (not shown), a chuck portion 18, and an inside diameter collet 18a disposed on the chuck portion 18.

The swing table 17 supports the chuck portion 18 in such a manner that the chuck portion 18 can be rotated around an axis P1 along the flat surface 15a. The inside diameter collet 18a of the chuck portion 18 is structured such that it can be inserted into a through hole formed along the axis P of the work 2 to thereby fix the inside diameter surface of the work 2 from inside. The chuck portion 18 and inside diameter collet 18a are respectively set so as to be coaxial with the swing table 17. By the way, if the work 2 is fixed by the inside diameter collet 18a, then the small-diameter-side end face of the work 2 is contacted with the end face of the chuck portion 18 and, at the same time, the axis P of the work 2 and the above-mentioned axis P1 are mutually situated on the same line.

Also, the swing table 17 is connected to the operation device 14 and is thus structured such that, in accordance with an instruction given by the operation device 14, it can rotate the work 2 through the chuck portion 18.

The swing table 17 includes a swing table sensor 17a shown in FIG. 5, such as a known encoder or the like. The swing table sensor 17a is connected to the operation device 14. The swing table sensor 17a is structured such that it can sequentially output to the operation device 14 rotation position signals respectively corresponding to the rotation positions of the work 2 as the position information thereof around the axis P. Here, referring to the term "rotation position", when a direction extending in a given direction from the center (axis P) is assumed to be a reference direction, an angle formed with respect to the thus-assumed reference direction around the center (axis P) is used as the "rotation position". By the way, in the shown embodiment, as the reference direction, there is used a direction which extends upwardly from the center (axis P).

The working unit 12 includes a unit main body 19, a working portion 20 and a contact sensor 21. The unit main body 19 is formed so as to extend from upside to downside along a direction meeting at right angles to the axis P. Also, the unit main body 19 is supported by an X axis drive device 22, a Y axis drive device 23 and a Z axis drive device 24 respectively shown in FIG. 5 in such a manner that it can be freely moved along arrow marks X, Y and Z respectively shown in FIGS. 1 and 2.

By the way, the arrow mark X shown in FIGS. 1 and 2 extends along the flat surface 15a (that is, extends in parallel to the axis P1) and also extend along a direction in which the unit 12 approaches and moves away from the work 2 supported by the chuck portion 18. Also, the arrow mark Z shown in FIG. 1 extends along a perpendicular direction which meets at right angles to the arrow mark X and also extends a direction along the unit 12 approaches and moves away from the flat surface 15a. Further, the arrow mark Y shown in FIG. 2 meets at right angles to both of the arrow mark X and arrow mark Z.

The X axis drive device 22, Y axis drive device 23 and Z axis drive device 24 respectively include an X axis sensor 22a, a Y axis sensor 23a and a Z axis sensor 24a. And, the X axis sensor 22a, Y axis sensor 23a and Z axis sensor 24a are respectively connected to the operation device 14. Also, the X axis sensor 22a, Y axis sensor 23a and Z axis sensor 24a are respectively structured such that they detect the shifts of the unit main body 19 with respect to their respective reference positions and then output to the operation device 14 an X axis shift signal, a Y axis shift signal and a Z axis shift signal respectively corresponding to the detected shifts of the unit main body 12. In the illustrated embodiment, the respective reference positions of the Y axis sensor 23a and Z axis sensor 24a are situated on the extension of the axis P of the work 2 supported by the chuck portion 18.

Now, the working portion 20 of the working unit 12 includes a drive device (not shown), a support shaft 25, a grindstone 26 and the like. The drive device is used to rotate the support shaft 25 around the axis thereof. The support shaft 25 is disposed in such a manner that it projects downwardly from the end face of the unit main body 19 that is situated at the lower end thereof. The axis of the support shaft 25 is set so as to extend along a perpendicular direction, that is, along the above-mentioned arrow mark Z.

The grindstone 26 is formed in a cylindrical shape and is mounted on the support shaft 25 in such a manner that it is coaxial with this support shaft 25. The grindstone 26 is structured such that, as the drive device rotates the support shaft 25, it is rotated together with the support shaft 25 around the axis of the support shaft 25, that is, around the above-mentioned arrow mark Z. If the grindstone 26 is rotated, then it can execute a grinding operation or the like on the recesses 4 or the like of the work 2.

Now, the contact sensor 21 includes a sensor main body 27, a support rod 28 and a contact element 29. The sensor main body 27 is mounted on the unit main body 19 of the working unit 12 and supports the support rod 28. The sensor main body 27 is also connected to the operation device 14 through a signal line.

The support rod 28 is formed so as to extend from the sensor main body 27 toward the end face 3 of the work 2 supported by the chuck portion 18. And, the support rod 28 is also formed so as to extend along the flat surface 18a, the above-mentioned arrow mark X and the axis P1 serving as the rotation center of the swing table 17. The support rod 28 is further structured such that it can freely appear and disappear along the flat surface 15a, the above-mentioned arrow mark X and the axis P1 serving as the rotation center of the swing table 17, and also that the axial direction of the support rod 28 can be inclined by an external force given from a direction which intersects the axis P. If the support rod 28 shifts in this manner, then there is output a signal from the sensor main body 27 of the contact sensor 21.

The contact element 29 is supported on the leading end of the support rod 28. If the inner surface of a positioning hole 30 (which will be discussed later) formed in the work 2 is contacted with the outer surface of the contact element 29, then the contact element 29 outputs a contact element contact signal to the operation device 14 through the sensor main body 27 or the like.

Now, the operation device 14 is a known computer and is connected to the swing table 17, X, Y and Z axis drive devices 22, 23 and 24, working portion 20, contact sensor 21 and the like. And, the operation device 14 controls the operations of these components to thereby control the whole of the machine tool 1. The operation device 14 is further connected to the swing table sensor 17a, X, Y and Z axis sensors 22a, 23a and 24a, and the like.

The operation device 14 has a first function which, in accordance with the position of the recess 4 around the axis P such as a Y axis shift signal y and a Z axis shift signal as well as first and second rotation position signals θ1 and θ2 (which will be discussed later) and the like, finds a rotation angle θ to set the recess 4 at a given position in the reference direction of the table sensor 17a or the like using an expression 1 (which will be discussed later).

And, the operation device 14 further has another function which, in accordance with the rotation angle θ found using the expression 1, drives the swing table 17 to thereby rotate the work 2 around the axis P. Also, the operation device 14 still further has a second function which positions the positioning hole 30 of the work 2 at a given position in the reference direction of the table sensor 17a or the like to thereby position the recess 4 at a given position.

Further, the operation device 14, after it positions the recess 4 at a given phase, drives the X, Y and Z axis drive devices 22, 23 and 24 to thereby position the grindstone 26 at its working position. By the way, various kinds of information such as the relative position relationship between the contact sensor 21 and grindstone 26, the diameter of the grindstone 26 and the like necessary for this operation of the operation device 14 have been previously stored in the operation device 14. After positioning the grindstone 26, the operation device 14 allows the grindstone 26 to grind the work 2.

When executing a grinding operation or a similar finishing operation on the work 2 using the above-structured machine tool 1, firstly, the phase of the work 2 is adjusted in such a manner that the recess 4 can be set at a given position, thereby positioning the work 2.

At first, in the work 2, as shown in FIG. 3, there is formed a positioning hole 30. The positioning hole 30 is formed at such a position that, when working the work 2 into a product having a final shape, does not raise any problem as to the function of the present product nor any inconvenience in the working operation of the present product. And, the positioning hole 30 is formed so as to have such a size that allows the contact element 29 to be inserted into the positioning hole 30 with enough play. By the way, in the shown embodiment, the positioning hole 30 is formed at a position where an angle, which is formed by a line connecting the center of the hole 30 and axis P and intersecting at right angles to the axis P and by a line connecting the bottom 4a of the recess 4 adjoining the hole 30 and intersecting at right angles to the axis P, is 45 degrees around the axis P.

The inside diameter surface of the work 2 is held on the inside diameter collet 18a of the chuck portion 18 of the rotary table 11 to thereby fix the work 2. An operator operates the X, Y and Z shaft drive devices 22, 23 and 24 respectively to thereby insert the contact element 29 of the contact sensor 21 into the positioning hole 30. By the way, at the then time, as shown in FIG. 4 (A), the contact element 29 is held at an inserted original position (IOP) in a state where it is not in contact with the inner surface of the positioning hole 30. At that time, the operation device 14 stores therein once a Y axis shift signal $y_0$ and a Z axis shift signal $z_0$ which are respectively output by the Y axis sensor 23a and Z axis sensor 24a in this state.

After then, until the contact element 29 is contacted with the inner surface of the positioning hole 30 and the operation device 14 detects a contact element contact signal, the chuck portion 18 together with the work 2 is rotated in a first direction such as in a clockwise direction along an arrow mark K1 shown in FIG. 4.

Figure 4A:
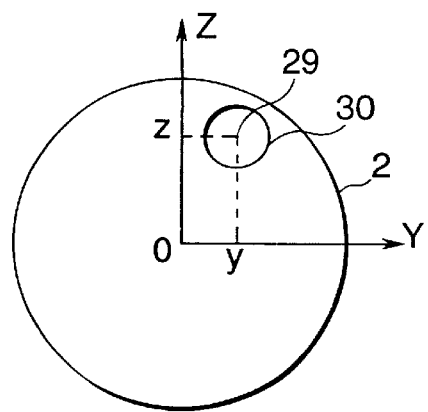
Figure 4B:
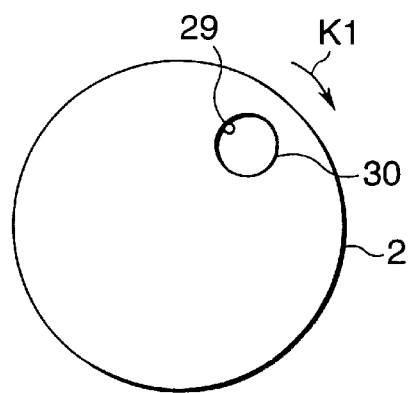
Figure 4C:
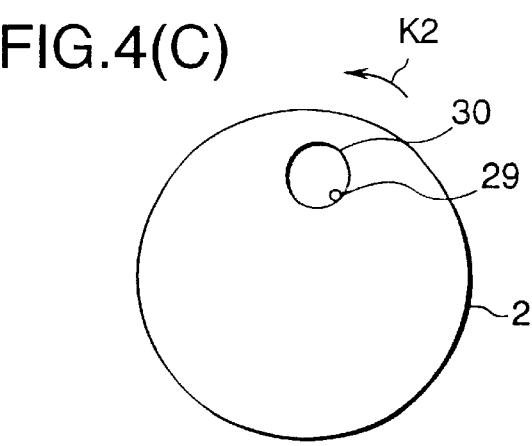

As shown in FIG. 4(B), when the contact element 29 is contacted with the inner surface of the positioning hole 30 at a first contact position (FCP), the operation device 14 stores therein once a first rotation position signal θ1 which is output by the swing table sensor 17a and corresponds to the rotation position of the chuck portion 18.

And then, until the contact element 29 is once detached from the inner surface of the positioning hole 30 and the operation device 14 detects a contact element contact signal again, the chuck portion 18 together with the work 2 is rotated in a second direction as the opposite direction of the first direction along an arrow mark K2 shown in FIG. 4 (C). As shown in FIG. 4 (C), when the contact element 29 is contacted with the inner surface of the positioning hole 30 at a second contact position (SCP), the operation device 14 stores therein once a second rotation position signal θ2 which is output by the swing table sensor 17a and corresponds to the rotation position of the chuck portion 18.

Figure 4D:
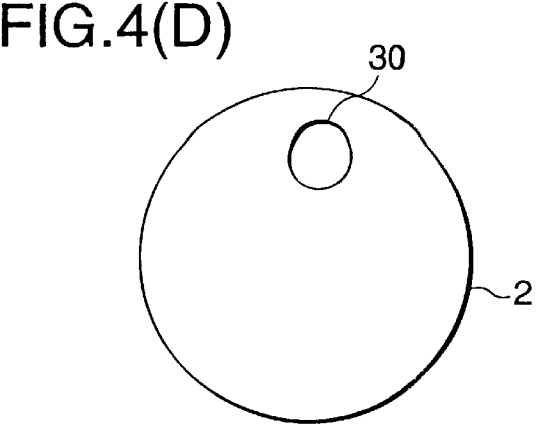

The operation device 14, after it rotates the work 2 along the direction shown by the arrow mark K1 to such a degree that the contact element 29 is not contacted with the inner surface of the positioning hole 30, drives the X axis drive device 22 to thereby pull the contact element 29 out of the positioning hole 30. The operation device 14 calculates a rotation angle θ using the expression 1 which is shown below. The operation device 14, in accordance with the thus calculated rotation angle θ, rotates the chuck portion 18 together with the work 2 to thereby, as shown in FIG. 4(D), position the recess 4 at a given position, that is, a position where the positioning hole 30 is situated in the reference direction of the swing table sensor 17a. After the phase adjusting operation of the work 2 is completed in this manner, the X, Y and Z shaft drive devices 22, 23 and 24 are respectively to thereby position the grindstone 26 at a given position.

[Expression 1]

$$\theta = \frac{\theta_1 + \theta_2}{2} - \tan^{-1}\left(\frac{y}{z}\right) \qquad \text{Expression 1}$$

Note that the rotation angle θ is an angle which is required to make it possible to rotate the work 2 in such a manner that the inserted original position (IOP) of the contact element 29 is disposed at a position contained in a center line of the positioning hole 30 being defined by connecting a rotational center (O) of the work 2 and the center of the positioning hole 30. Namely, when the work 2 is rotated by the rotation angle θ thus calculated after the contact element 29 has been inserted at the inserted original position IOP in the positioning hole 30, the contact element 29 can be positioned at a position contained in the center line of the positioning hole 30, to thereby set or adjust the work 2 at an initial predetermined phase allowing to start an accurate machining operation.

Note that although in the embodiment the work 2 is actually rotated and moved with respect to the contact element 29 to calculate the rotation angle θ in the above-mentioned embodiment, in order to make it easier to understand a reason why the rotation angle can be calculated by the above-mentioned expression 1 and a relative rotation between the contact element 29 and the work 2, an imaginary case that a position of the contact element 29 is revolved around the center axis of the work 2 during the calculation of the rotation angle is hereinafter explained in accompany with FIGS. 4(E) to 4(I)

An operator operates the X, Y and Z shaft drive devices 22, 23 and 24 respectively to thereby insert the contact element 29 of the contact sensor 21 into the positioning hole 30. By the way, at the then time, as shown in FIG. 4 (E), the contact element 29 is held at an inserted original position (IOP) in a state where it is not in contact with the inner surface of the positioning hole 30. At that time, as shown in FIG. 4(E), the inserted original position (IOP) is defined at a position ($y_0$, $z_0$) on a Y-Z coordination which has a coordinate axis Y extending in parallel with the Y shaft and containing the center axis O of the work 2 and a coordinate axis Z extending in parallel with the Z shaft, containing the center axis O of the work 2 and extending perpendicular to the coordinate axis Y. Further, an inserted original angle $\theta_0$, which is defined by the coordinate axis Z and a line L1 formed by connecting the inserted original position (IOP) and the center axis O of the work 2, can be represented by an equation of $\theta_0 = \tan^{-1}(y_0/z_0)$ At this time, the operation device 14 stores therein once a Y axis shift signal and a Z axis shift signal which are respectively output by the Y axis sensor 23a and Z axis sensor 24a in this state.

After then, until the contact element 29 is contacted with the inner surface of the positioning hole 30 and the operation device 14 detects a contact element contact signal, the contact element 29 is revolved around the center axis C of the works in a first direction such as in a counter-clockwise direction along an arrow mark FD shown in FIG. 4(F).

As shown in FIG. 4(F), when the contact element 29 is contacted with the inner surface of the positioning hole 30 at a first contact position (FCP), the operation device 14 stores therein once a first rotation position signal which is output by the swing table sensor 17a and corresponds to a first rotation position angle $\theta_1$, where the first rotation position angle $\theta_1$ is is defined by the coordinate axis Z and a line L2 formed by connecting the first contact position (FCR) and the center axis O of the work 2.

And then, until the contact element 29 is once detached from the inner surface of the positioning hole 30 and the operation device 14 detects a contact element contact signal again, the contact element 29 is revolved around the center axis O of the work 2 a second direction as the opposite direction of the first direction along an arrow mark SD shown in FIG. 4 (G). As shown in FIG. 4 (G), when the contact element 29 is contacted with the inner surface of the positioning hole 30 at a second contact position (SCP), the operation device 14 stores therein once a second rotation position signal which is output by the swing table sensor 17a and corresponds to a second rotation position angle $\theta_2$, where the second rotation position angle $\theta_2$ is defined by the coordinate axis Z and a line L3 formed by connecting the first contact position (FCR) and the center axis C of the work 2.

Through these operations, as shown in FIG. 4(H), the operation device 14 can calculate an averaged angle $((\theta_1+\theta_2)/2)$ which is defined by the coordinate axis Z and a center line L4 formed by connecting a center of the positioning hole 30 and the center axis O of the work 2.

Accordingly, as shown in FIG. 4(I), the operation device 14 can calculate a rotation angle $\theta$ which is required to make it possible to move the contact element 29 from the inserted original position (IOP) to a position contained in the center line L4 of the positioning hole 30. That is the rotation angle $\theta$ is defined by the expression 1 below.
[Expression 1]

$$\theta = \frac{\theta_1 + \theta_2}{2} - \tan^{-1}\left(\frac{y}{z}\right) \quad \text{Expression 1}$$

That is an explanation regarding a reason why the rotation angle $\theta$ can be calculated through the expression 1.

Figure 13:
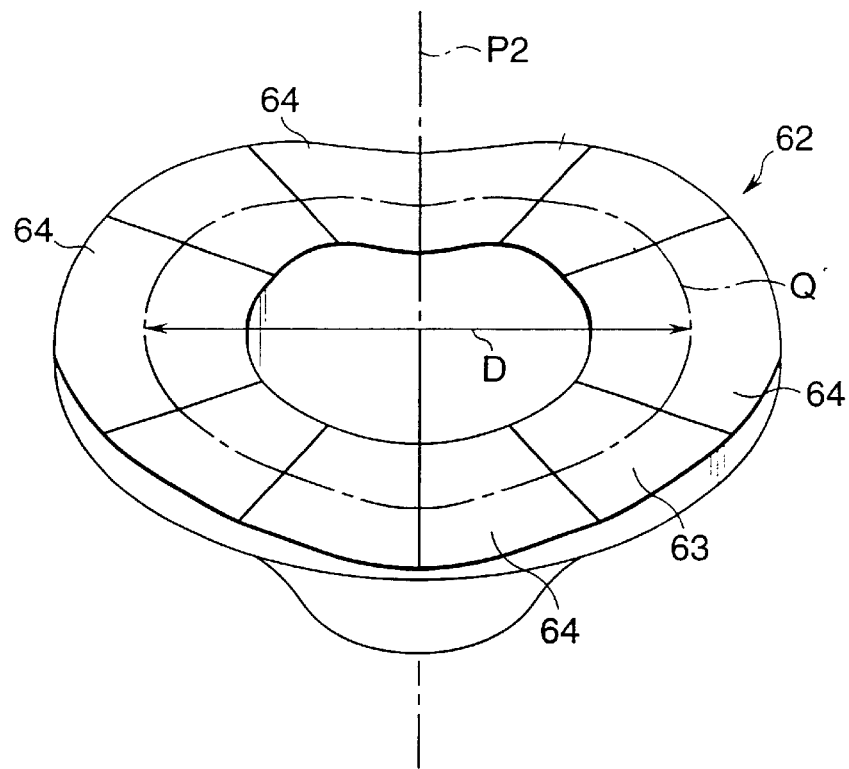
FIG. 13 is a perspective view of a work.
Figure 14:
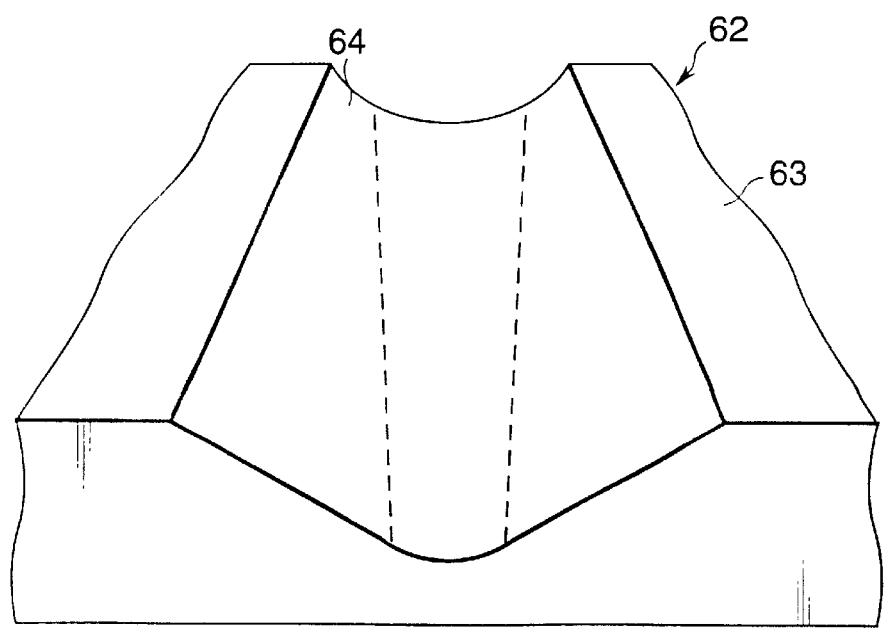
FIG. 14 is a partially enlarged perspective view of the work shown in FIG. 13; and, FIG. 15 is a partially enlarged section view of the work shown in FIG. 13.
Figure 15:
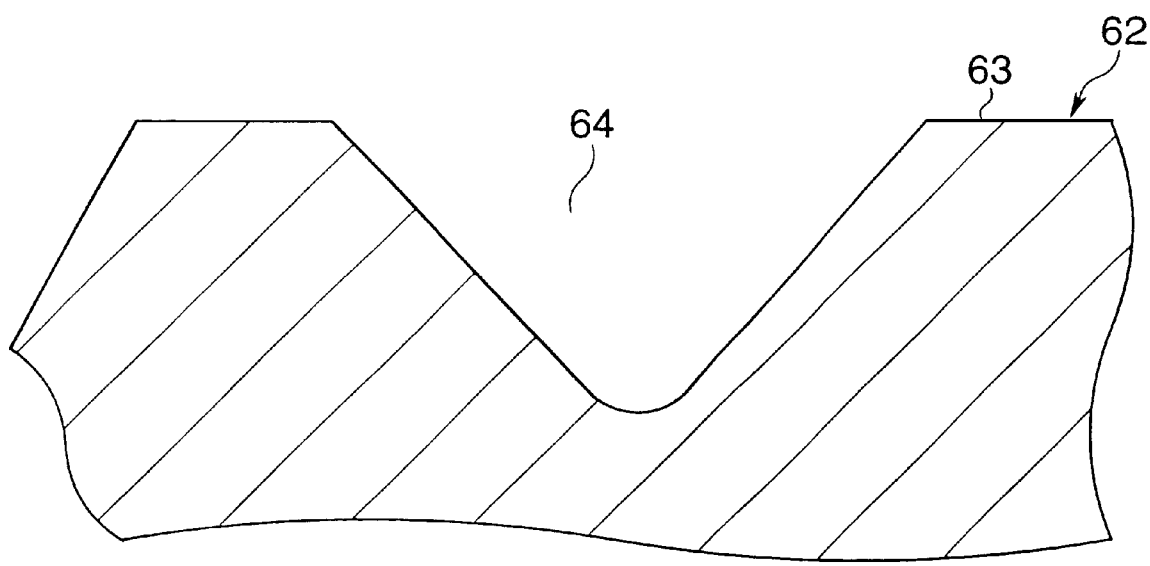

Turning to an explanation of the embodiment, as described above, after the work 2 is positioned, the operation device 14 drives the drive device of the working portion 20 to thereby rotate the grindstone 26 and, at the same time, drives the drive device of the swing table 17 and X axis drive device 22 to cut and remove the machining allowance 2a of the recess 4 using the grindstone 26, thereby forming the cam surface 104. By the way, the relative positions of the grindstone 26 and work 2 during the grinding operation are determined by the angle of the work 2 around the axis P and the shift of the grindstone 26 along the arrow mark X. Also, description will be given below of the relative motion locus at the then time of the unit main body 19 with respect to the work 2 using the drive device of the swing table 17 and X axis drive device 22, with reference to FIG. 11 which shows part of the motion of the unit main body 19 when the unit main body 19 is moved in a direction along a specific straight line such as in a direction extending along the pitch circle of the cam disk 102 shown by a one-dot chained line Q in FIG. 13. By the way, the term "pitch circle" is a circle which has a diameter D equivalent to the mean of the inside and outside diameters of the cam disk 102.

Figure 11:
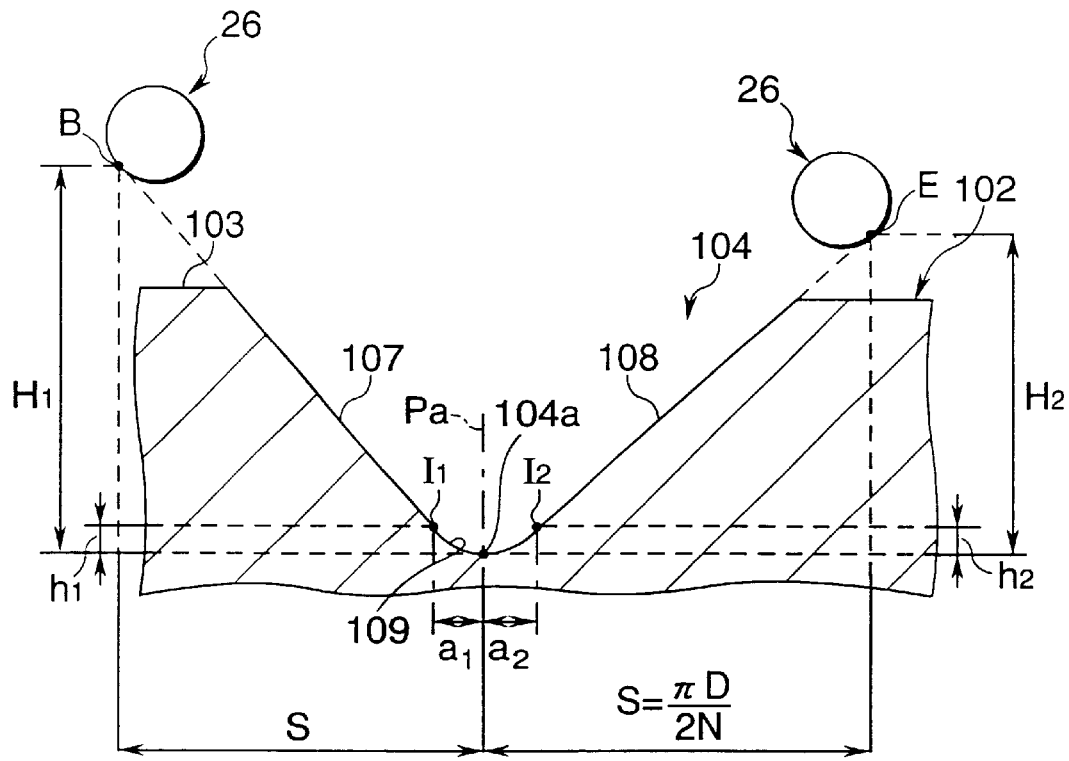
FIG. 11 is an explanatory view of a typical moving locus of a grindstone in the machine tool according to the invention obtained when the grindstone forms a cam surface.

In FIG. 11, the number of cam surfaces 104 per cam disk 102 is expressed as N, the diameter of the pitch circle of the cam disk 102 is expressed as D, and the respective height shift amounts (leads) in the axis Pa direction per 360 deg. of the inclined surface 107 and 108 forming the cam surface 104 are respectively expressed as L1 and L2. The grindstone 26, in a net shown in FIG. 11, carries out a grinding operation while moving from its start point B through intermediate points $I_1$ and $I_2$ up to an end point E. Here, the intermediate point $I_1$ shows a point at which the inclined surface 107 and arc surface 109 are connected to each other, while the intermediate point $I_2$ shows a point at which the arc surface 109 and inclined surface 108 are connected to each other.

Also, in FIG. 11, the radius of curvature of the arc surface 109 is expressed as R, a distance between the bottom 104a of the cam surface 104 and start point B along the axis Pa of the cam disk 102 is expressed as H1, a distance between the bottom 104a of the cam surface 104 and end point E along the axis Pa of the cam disk 102 is expressed as H2, and a distances between the bottom 104a of the cam surface 104 and start point B and end point E along the peripheral direction of the cam disk 102 are respectively expressed as S. Here, each of the two distances S is $(\pi D)/(2N)$.

According to these conditions, the above-mentioned distances H1 and H2 can be expressed by the following expressions, respectively.
[Expression 2]

$$H_1 = \frac{L_1}{2N} - \left\{\sqrt{R^2 + \left(\frac{RL_1}{\pi D}\right)^2} - R\right\} \quad \text{Expression 2}$$

$$H_2 = \frac{L_2}{2N} - \left\{\sqrt{R^2 + \left(\frac{RL_2}{\pi D}\right)^2} - R\right\} \quad \text{Expression 3}$$

Further, if a distance between the bottom 104a of the cam surface 104 and intermediate point $I_1$ along the axis P of the cam disk 102 is expressed as h1, a distance between the bottom 104a of the cam surface 104 and intermediate point $I_2$ along the axis P of the cam disk 102 is expressed as h2, a distance between the bottom 104a of the cam surface 104 and intermediate point $I_1$ along the peripheral direction of the cam disk 102 is expressed as a1, and a distance between the bottom 104a of the cam surface 104 and intermediate point $I_2$ along the peripheral direction of the cam disk 102 is expressed as a2, then these distances h1, h2, a1 and a2 can be expressed by the following expressions 4 through 7.
[Numeric Expression 3]

$$h_1 = \frac{-Q_1 - \sqrt{Q_1^2 - 4k_1 m_1}}{2k_1} \quad \text{Expression 4}$$

$$a_1 = \sqrt{2Rh_1 - h_1^2} \quad \text{Expression 5}$$

$$h_2 = \frac{-Q_2 - \sqrt{Q_2^2 - 4k_2 m_2}}{2k_2} \quad \text{Expression 6}$$

$$a_2 = \sqrt{2Rh_2 - h_2^2} \quad \text{Expression 7}$$

where $k1=(R-H1)^2+S^2$
$Q1=2RH1(R-H1)^2-2S^2R$
$m1=R^2 H1^2$
$k2=(R-H2)^2+S^2$
$Q2=2RH2(R-H2)^2-2S^2R$
$m2=R^2 H2^2$ When cutting and removing the machining allowance 2a to thereby form the cam surface 104 using the grindstone 26 in the above-mentioned manner, the grindstone 26 carries out a grinding operation which starts at the start point B as a position satisfying the above expression 2 and distance $S=(\pi D)/(2N)$, passes through the intermediate point $I_1$ as a position satisfying the above expressions 4 and 5 and the intermediate point $I_2$ as a position satisfying the above expressions 6 and 7, and ends at the end point E as a position satisfying the above expression 3 and distance $S=(\pi D)/(2N)$.

Also, as shown in FIG. 12, if there is employed a coordinate system in which the start point B is assumed to be a position where a rotation position to be detected by the swing table sensor 17a is 0 deg., the bottom 104a of an ideal arc surface 109 of the cam disk 102 is assumed to be a position where a height along the axis P direction is 0, and the above rotation position a and a height H from the bottom 104a of the cam surface 104 along the axis P are used as variables, then the coordinates of the start point B, intermediate points $I_1$ and $I_2$, and end point E are respectively shown as follows:

[Numeric Expression 4]

$$B : (0, H_1)$$
$$I_1 : \left(\frac{360}{2N} - \frac{a_1 \times 360}{\pi D}, h_1\right)$$

Also, if it is assumed that the cam disk 102 includes N $$I_2 : \left(\frac{360}{2N} - \frac{a_2 \times 360}{\pi D}, h_2\right)$$
$$E : \left(\frac{360}{N}, H_2\right)$$

pieces of cam surfaces 104, the numbers from 1 to N are respectively given to these cam surfaces 104, and the start point B, intermediate points $I_1$ and $I_2$, and end point E that satisfy the above-mentioned coordinates provide the first cam surface 104, then the respective coordinates of a start point Bi, intermediate points $I_1 i$ and $I_2 i$, and an end point Ei which form an i-th cam surface 104 can be expressed in the following manner:

[Numeric Expression 5]

$$Bi : \left(0 + \frac{360}{N} \times (i-1), H_1\right)$$
$$I_1 i : \left(\frac{360}{2N} - \frac{a_1 \times 360}{\pi D} + \frac{360}{N} \times (i-1), h_1\right)$$

The operation device 14 has previously stored the above-mentioned coordinates therein and, therefore, in accordance with these coordinates, the operation device 14 drives the table 17, X, Y and Z axis drive devices 22, 23 and 24 to thereby form the cam surface 102. By the way, if the depth of the machining allowance 2a is larger than the depth that can be work by the working unit, that is, if the depth of the machining allowance 2a is larger than the depth that can be cut once by the working unit, then the machining allowance 2a is to be worked twice or more times. In this case, when forming the cam disk 102, as will be described below, an adjusting shift h along the axis Pa is added to the respective coordinates of the start point Bi, intermediate points $I_1 i$ and $I_2 i$, and end point Ei which are used to form the above-mentioned i-th cam surface 104, and, while adjusting the adjusting shift h properly, the grinding operation is carried out.

The adjusting shift h is set in such a manner that a value obtained by subtracting the adjusting shift h from the depth of the machining allowance 2a along the axis Pa does not exceed the depth that can be cut once by the working unit 12. And, the adjusting shift h is made to vary so as to decrease each time the working unit 12 works the circumference of the cam disk 102 once, that is, each time the working unit 12 works the N pieces of cam surfaces 104; and, finally, the working unit 12 executes its working operation under the condition of the adjusting shift h=0, that is, under the condition that the start point Bi, intermediate points $I_1 i$ and $I_2 i$, and end point Ei respectively satisfy the above-mentioned coordinates, which can end the working operation by the working unit 12. By the way, when it is necessary to measure the size of the machining allowance 2a, after completion of the phase adjusting operation, prior to start of a working operation, it is necessary to find, for example, the height of the bottom 4a of the recess 4 along the arrow mark X (for example, when the reference of a direction along the arrow mark X is assumed to be the end face of the chuck portion 18, a distance from the end face of the chuck portion 18) using the contact sensor 21 and, after then, to find the difference between the thus found height and a height to be finished. Besides, for example, when the end face 3 of the work 2 is used as the reference, the end face 3 is measured and, with the measured end face 3 as a reference surface, the difference between the heights of the bottom 4a of the recess 4 and the end face along the arrow mark X may be obtained.

[Numeric Expression 6]

$$Bi : \left(0 + \frac{360}{N} \times (i-1), H_1 + h\right)$$
$$I_1 i : \left(\frac{360}{2N} - \frac{a_1 \times 360}{\pi D} + \frac{360}{N} \times (i-1), h_1 + h\right)$$
$$I_2 i : \left(\frac{360}{2N} - \frac{a_2 \times 360}{\pi D} + \frac{360}{N} \times (i-1), h_2 + h\right)$$
$$Ei : \left(\frac{360}{N} + \frac{360}{N}(i-1), H_2 + h\right)$$

According to the above-mentioned method for positioning or phase adjusting the work 2 in the machine tool 1, the rotary table 11 holds the work 2 around the axis P in a freely rotatable manner, the contact element 29 of the contact sensor 21 or the like detects the position of the recess 4 around the axis P and, in accordance with the thus detected position, the operation device 14, using the expression 1, finds the rotation angle θ which is used to position the recess 4 at a given position. And, the operation device 14 rotates and positions the work 2 around the axis P in accordance with the thus found rotation angle θ, which makes it possible to position the work 2 around the axis P with high accuracy.

Also, due to the fact that the operation device 14 find the rotation angle θ according to the above-mentioned expression 1 and rotates and positions the work 2 around the axis P in accordance with the thus found rotation angle θ, an operation to position the work 2 can be automated. Thanks to this, the operation to be executed by an operator prior to the automatic work positioning operation may be only the operation to position the contact element 29 into the recess 4 using the X, Y and Z axis drive devices 22, 23 and 24, which does not require accuracy but is simple. Therefore, it is possible to restrict an increase in the manufacturing cost of the work 2.

Figure 6:
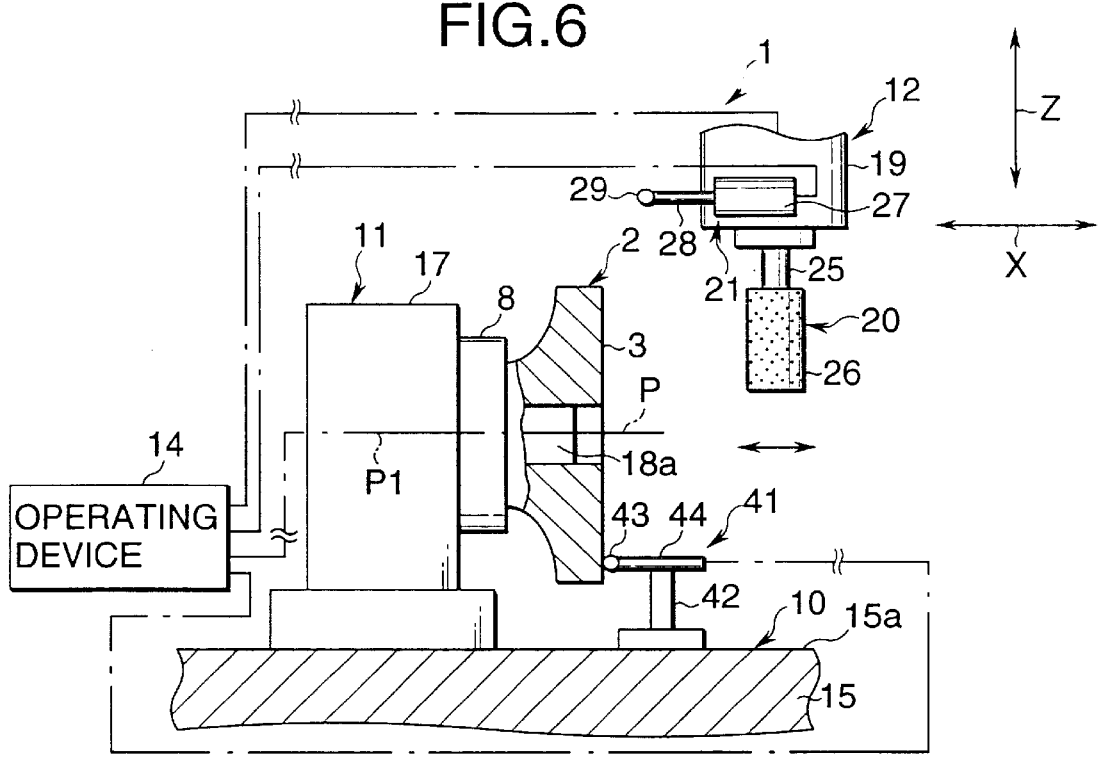
FIG. 6 is a side view of the structure of a machine tool according to a second embodiment of the invention.
Figure 7:
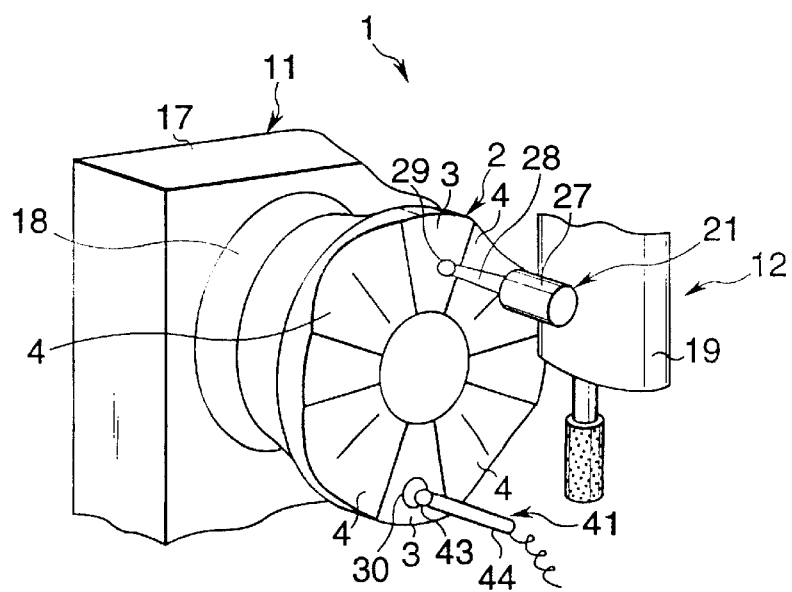
FIG. 7 is a perspective view of a portion of the machine tool according to a second embodiment, showing a process in which the work is positioned by the machine tool according to the second embodiment.
Figure 8A:
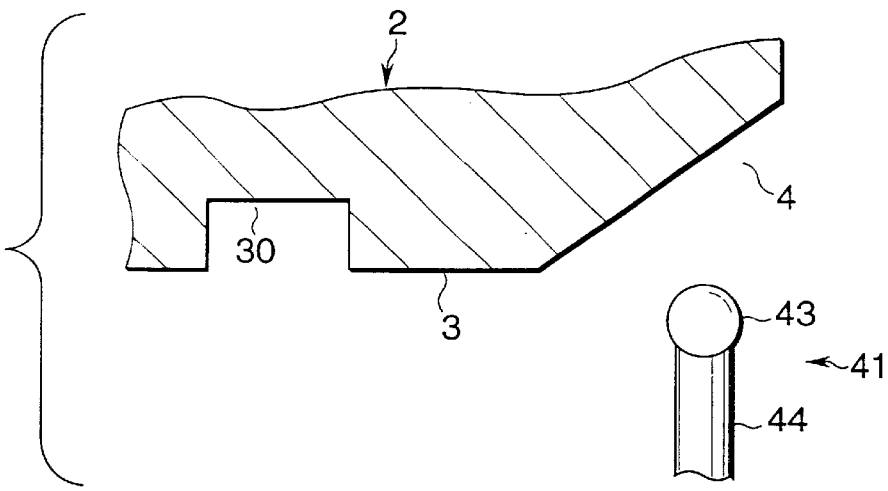
FIGS. 8(A)–8(C) shows an explanatory view of a process in which the existence of a positioning hole is detected by a close approach element provided in the machine tool according to the second embodiment.
Figure 8B:
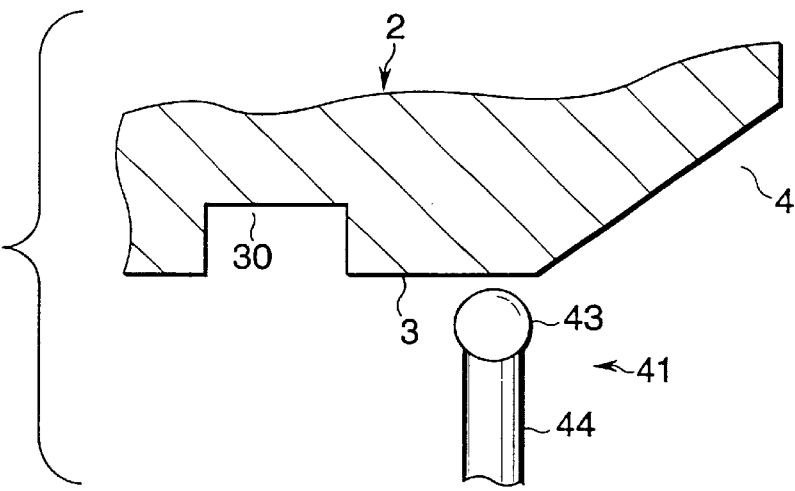
Figure 8C:
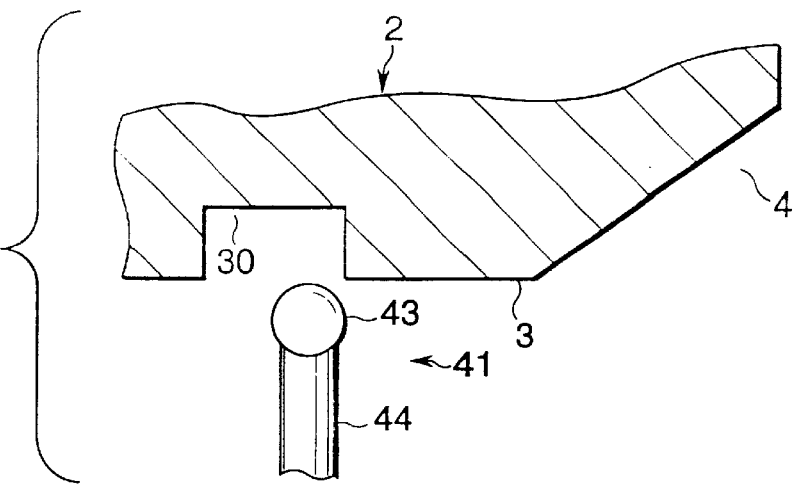

Now, FIGS. 6 through 8 shows a second embodiment of a phase adjusting method according to the invention. In the Second embodiment, the same parts as those employed in the previously described first embodiment are given the same designations and thus the description-thereof is omitted here.

A machine tool 1 according to the inventions, as shown in FIG. 6 and in other figures, comprises a close approach sensor 41. The close approach sensor 41 includes a support body 42 and a close approach element 43. The support body 42 is mounted on the flat surface 15a of the table portion 15.

The support body 42 includes a support rod 44 which is provided so as to extend toward the end face 3 of the work 2 supported by the chuck portion 18. The support rod 44 is arranged so as to extend along the flat surface 15a, the above-mentioned arrow mark X, and the axis P1 serving as the rotation center of the swing table 17. Also, the support rod 44 is structured in such a manner that it can be mounted and removed easily or can be advanced and retreated along the arrow mark X in order not to provide an obstacle when mounting the work 2 onto the chuck portion 18.

The close approach element 43 is supported on the leading end of the support rod 44, while the close approach element 43 is arranged on a line which extends straight downwardly along a direction at right-angles to the axis P of the work 2 supported by the chuck portion 18. Also, the close approach element 43 is located at a position which, when the work 2 is rotated by the chuck portion 18 or the like, corresponds to the positioning hole 30 formed in the work 2.

And, the close approach element 43 is connected to the operation device 14 and the like. If the blank member of the work 2 approaches the neighboring portion of the close approach element 43, then the close approach element 43 issues a close approach signal to the operation device 14. The close approach element 43 is structured such that, if the end face 3 of the work 2 faces the close approach element 43, it outputs the above-mentioned close approach signal to the operation device 14 and, if the distance between the work 2 such as the recess 4, positioning hole 30 thereof and itself is greater than the distance between the end face 3 of the work 2 and itself, it does not issue any signal.

The operation device 14 of the machine tool 1 according to the present embodiment, in accordance with the state of the close approach signal from the close approach sensor 41, rotates the swing table 17 and stops the swing table 17 at a position where the close approach sensor 41 is opposed to the positioning hole 30. The operation device 14 stores once a rotation position signal which is output by the swing table sensor 17a at the then time.

And, from this state, the swing table 17 is rotated at a given angle such as an angle of 180 deg. or the like to thereby position the work 2. This given angle is set in such a manner that, after the work 2 is positioned, when the X, Y and Z axis drive devices 22, 23 and 24 are respectively driven to thereby position the contact element 29 at a previously set position, the contact element 29 can be inserted into the positioning hole 30 of the work 2.

When carrying out a grinding operation or other similar operations on the work 2 using the machine tool 1 according to the invention, as shown in FIG. 8 (A), the work 2 is positioned at and fixed to the chuck portion 18 in such a manner that a recess 4 adjoining the end face 3 with the above-mentioned positioning hole 30 formed therein is opposed to the close approach element 43. At the then time, the close approach element 43 keeps a state in which the close approach element 43 does not issue a close approach signal.

The operation device 14 rotates the chuck portion 18 together with the work 2 in a direction where the positioning hole 30 gradually approaches the close approach element 43. As a result of this, as shown in FIG. 8 (B), the close approach element 43 faces the end face 3 and thus issues a close approach signal. Next, as shown in FIG. 8 (C), the close approach element 43 faces the positioning hole 30 and thus does not issue the close approach signal any longer.

And, the operation device 14 stops the swing table 17 and stores once a rotation position signal output from the swing table sensor 17a. At the then time, as shown in FIG. 7, not only the positioning hole 30 faces the close approach element 43, but also the positioning hole 30 is situated in a direction which is inclined at about 180 deg. with respect to the above-mentioned reference direction of the swing table sensor 17a.

After then, the operation device 14 rotates the chuck portion 18 by the above-mentioned given angle in such a manner that the positioning hole 30 is situated almost in the reference direction of the swing table 17. In the illustrated embodiment, the chuck portion 18 is rotated by 180 deg. as the given angle.

Also, when there exists a mounting error in the close approach sensor 41 or the like, or when the close approach element 43 issues a close approach signal before it perfectly faces the positioning hole 30, preferably, a compensation angle corresponding to the mounting error may be added to the above-mentioned given angle. In this case, the chuck portion 18 can be rotated by an amount corresponding to the compensated given angle and thus the work 2 can be positioned in such a manner that the positioning hole 30 is situated substantially in the reference direction. What is important is that, after the rotation of the chuck portion 18, due to the next positioning operation to be executed by the X, Y and Z axis drive devices 22, 23 and 24, there can be obtained such a position relationship as to allow the contact element 29 to be inserted into the positioning hole 30.

And, if the operation device 14 drives the X, Y and Z axis drive devices 22, 23 and 24 respectively to their previously set positions, then the contact element 29 can be inserted into the positioning hole 30. After then, according to a similar step to the step that is executed using the machine tool 1 according to the previously described first embodiment, the position of the recess 4 along the peripheral direction of the work 2, that is, the phase thereof is adjusted to thereby position the work 2 and, at the same time, the work 2 is ground or similarly worked to remove the machining allowance 2a therefrom, thereby forming the cam surface 104.

According to the work 2 positioning or phasing method using the machine tool 1 according to the above-mentioned second embodiment, similarly to the phasing method using the machine tool 1 according to the previously-mentioned first embodiment, not only the work 2 can be positioned around the axis P with high accuracy but also the work 2 positioning operation can be automated, thereby being able to restrict an increase in the production cost of the work 2.

Also, according to the work 2 positioning or phasing method using the machine tool 1 according to the above-mentioned second embodiment, since it is possible to automate an operation to insert the contact element 29 into the positioning hole 30, an increase in the production cost of the work 2 can be restricted further. Due to this, the operator needs only to pay attention to the mounting direction of the work 2. That is, the operator needs only to set the relative position relationship between the close approach element 43 and positioning hole 30 in such a manner as shown in FIG. 8 (A). By the way, the work 2 may also be mounted in such a manner as shown in FIG. 8 (B) and thus a step from FIG. 8 (A) to FIG. 8 (B) may be omitted.

Next, description will be given below of a third embodiment of a phase adjusting method and a recess machining apparatus according to the invention in which there is eliminated the need to use, as the reference for the phase adjustment of the work 2, the positioning hole 30 previously formed in the work 2 as in the above-mentioned first and second embodiments. That is, according to this method, in a state where the work 2 is provisionally positioned by the operator, the recess 4 is measured by the contact sensor 21 and, in accordance with the measured result, the shift amount of the work 2 with respect to the phase thereof to which the work 2 should be adjusted is obtained by calculation; and, the thus obtained shift amount is corrected to thereby adjust the phase of the work 2.

Figure 10:
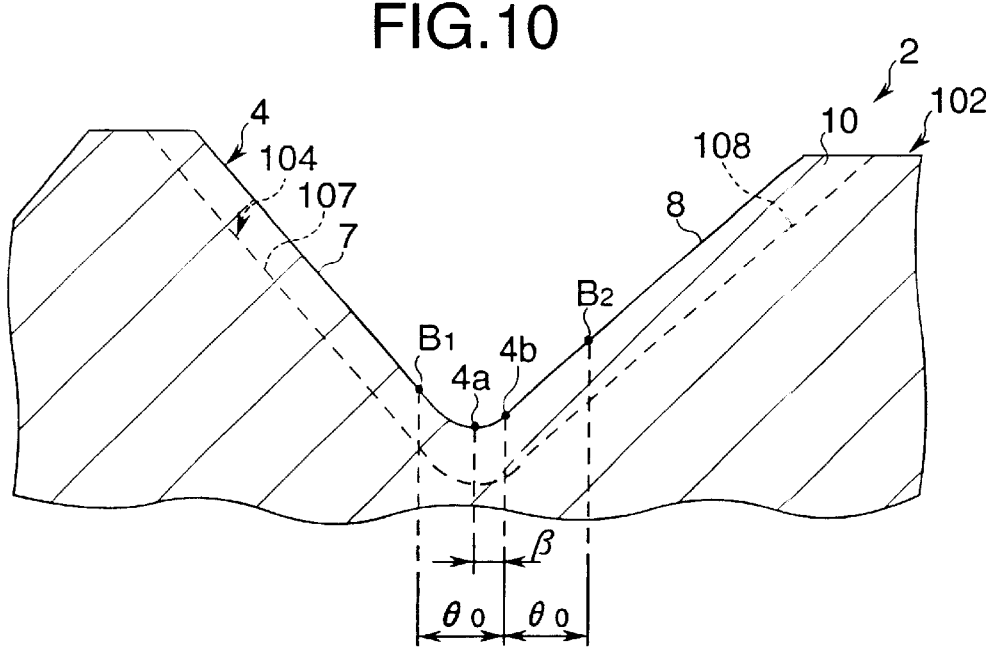
FIG. 10 is an explanatory view of a typical process for finding the position of the bottom of the recess using a contact element in the machine tool according to the invention.

As shown in FIG. 10, it is assumed that, in the provisionally positioned state of the work 2, the opposing position 4b between the contact sensor 21 and recess 4 is shifted with respect to the position of the bottom 4a to be adjusted in phase by a shift amount corresponding to an angle β (unit: degree). At a position where the work 2 is rotated from the first opposing position 4b by a given angle±θ of 0 degree by the drive device of the swing table 17, heights x1 and x2 from the reference positions of the inclined surfaces 7 and 8 along the arrow mark X are respectively measured by the contact sensor 21 and, in accordance with the thus measured results, the above-mentioned angle β is obtained according to the following expression 10. And, with the thus obtained angle β taken into account, the work 2 is rotated by a given angle to thereby be able to complete the phase adjustment of the bottom 4a.

Figure 9:
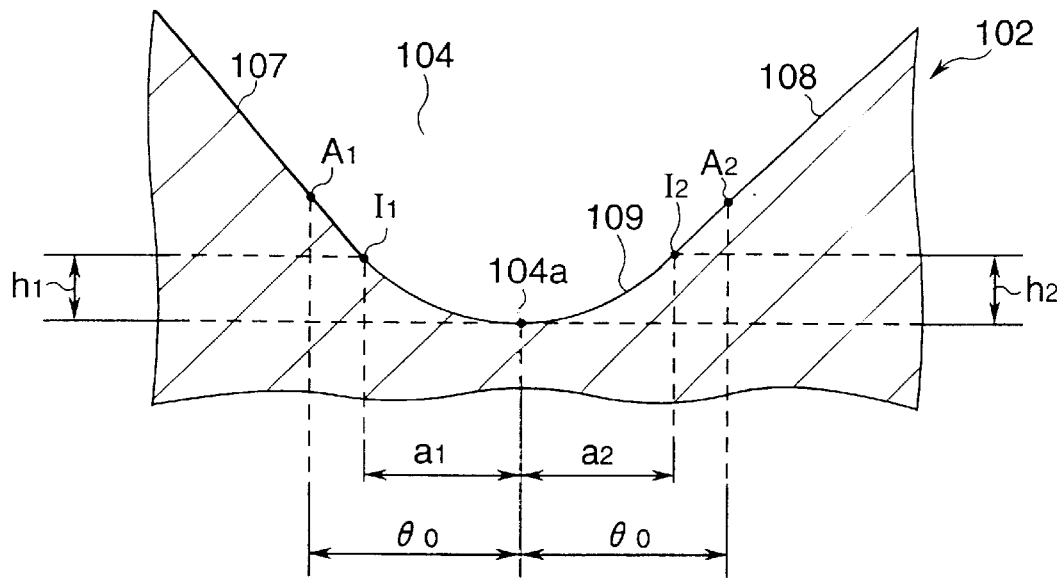
FIG. 9 is a partially enlarged section view of a cam disk to be formed by a machine tool according to the invention.

Generally, as shown in FIG. 9, in the ideal cam surface 104 of the cam disk 102, if a shift amount (lead) of the height along the axis P1 per 360 deg. of the inclined surface 107 is expressed as L1, the lead of the inclined surface 108 is expressed as L2, the heights of the intermediate points $I_1$ and $I_2$ from the bottom 104a are respectively expressed as h1 and h2, and the angles of the bottom 104a with respect to the intermediate points $I_1$, and $I_2$ along the peripheral direction of the cam surface 104 are respectively expressed as a1 and a2, then the difference δh between the heights of positions A1 and A2, which are respectively distant by an angle=θ0 from the bottom 104a of the ideal cam surface 104, along the arrow mark X from the bottom 4a can be shown by the following expression 8:

[Numeric Expression 7]

$$\Delta h = h_1 + \frac{(\theta_0 - a_1)L_1}{360} - h_2 - \frac{(\theta_0 - a_2)L2}{360} \quad \text{Expression 8}$$

Here, as shown in FIG. 10, in the work 2, if a shift (angle) between the above-mentioned opposing position 4b and the ideal cam surface 104, that is, the bottom 4a of the recess 4 is expressed as β, and the heights of positions B1 and B2, which are respectively distant from the opposing position 4b by an angle =θ0, along the arrow mark X are respectively expressed as x1 and x2, then the following expression 9 can be established according to the above expression 8, assuming that the machining allowance 2a is uniform. If the above-mentioned angle β is found from the expression 9, then there can be obtained the following expression 10.

[Numeric Expression 8]

$$\Delta h = X - X_2 + \frac{\beta(L_1 + L_2)}{360} \quad \text{Expression 9}$$

$$= h_1 + \frac{(\theta_0 - a_1)L_1}{360} - h_2 - \frac{(\theta_0 - a_2)L_2}{360}$$

$$\beta = \frac{\left( \begin{array}{c} (X_2 - X_1) \times 360 + 360h_1 + \\ (\theta_0 - a_1)L_1 - 360h_2 - (\theta_0 - a_2)L_2 \end{array} \right)}{(L_1 + L_2)} \quad \text{Expression 10}$$

Here, an example of a concrete phase adjusting method will be shown below. That is, description will be given below of a case in which, as a reference direction, there is used a direction which extends upwardly from a center (axis P). At first, an operator mounts the work 2 onto the chuck portion 18 in such a manner that one cam bottom 4a extends substantially in a perpendicular direction. At the then time, an angle P as a shift amount between the reference direction (perpendicular direction) and the above-mentioned one cam bottom 4a is unknown.

Next, by using the X, Y and Z axis drive devices 22, 23 and 24 respectively, the contact sensor 21 is positioned in such a manner that the axis of the support rod 28 thereof is situated within a perpendicular surface containing the axis P therein and also that the contact element 29 faces the recess 4 of the work 2 that is situated in the above-mentioned reference direction. As a height (in a direction along the arrow mark Z) from the axis P, for example, there is employed a height that corresponds to the diameter D of the pitch circle of a cam surface shown by a one-dot chained line in FIG. 13. That is, the height half of the diameter D from axis P is used.

Next, the drive device of the swing table 17 is driven to thereby rotate the work 2 by an angle of −θ0 deg. and, after then, the X axis drive device 22 is driven to thereby move the contact sensor 21 along the arrow mark X toward the work 2 until it is contacted with the inclined surface 7 of the recess 4. And, the operation device 14 is operated to thereby read and store the then height x1 along the arrow mark X. This corresponds to the position data of the position B1 in FIG. 10.

Next, after the contact sensor 21 is retreated by a proper amount using the X axis drive device 22, the drive device of the swing table 17 is driven to thereby rotate the work 2 by an angle of +2θ0 deg. That is, the sensor 21 is disposed opposed to the position of θ0 from the first position thereof. After then, the X axis drive device 22 is driven to thereby move the contact sensor 21 along the arrow mark X toward the work 2 until it is contacted with the inclined surface 8 of the recess 4. And, the operation device 14 is operated to thereby read and store the then height x2 along the arrow mark X. This corresponds to the position data of the position B2 in FIG. 10.

Next, the contact sensor 21 is retreated. And, the operation device 14 is allowed to calculate the angle β according to the expression 10, using the heights x1 and x2.

Finally, using the drive device of the swing table 17, the work 2 is rotated by-β-(360 deg./2N) from the first position and this angle is employed as the new reference direction of the swing table 17. After then, a grinding operation is allowed to start. The procedure for this working or grinding operation is similar to the procedure that has been discussed in the above-mentioned first and second embodiments.

The degree of the accuracy of the above-mentioned provisional positioning, that is, how small the angle β is and how large the angle θ0 is may be such that, in the provisionally positioned state, when the work 2 is rotated by an angle of ±θ0 deg., the contact sensor 21 is not opposed to the end face 3 of the work 2 or the arc surface of the recess 4 but is opposed to the inclined surfaces 7 and 8.

In this case, when positioning the work 2 in the machine tool 1, the opposing position 4b is determined once in the recess 4 and, after then, the heights x1 and x2 of the positions B1 and B2 respectively distant by ±θ0 from the opposing position 4b are respectively measured using the contact element 29. And, using the above-mentioned expression 10, the angle β, which is a mutual shift amount between the opposing position 4b and the ideal cam surface 104, that is, the bottom 4a of the recess 4, is obtained; and, in accordance with the thus obtained angle β, the swing table 17 is rotated. Thanks to this, even if the positioning hole 30 is not formed, because there is no need to use the positioning hole 30, the work 2 can be positioned, that is, can be adjusted in phase in such a manner that the recess 4 is positioned at a given position. Also, since the heights of the inclined surfaces 7 and 8 are measured using the contact sensor 21 and the angle β as a correction amount is obtained in such a manner that the machining allowances 2a of the inclined surfaces 7 and 8 are equal to each other, there is no possibility that only one of the inclined surfaces 7 and 8 can be ground in a larger amount than the other, which in turn can eliminate a fear that an overload can be applied to the working unit 12 serving as a grinding spindle.

The present disclosure relates to subject matter contained in Japanese Patent Application No. Hei. 10-352880 which is filed on Dec. 11, 1998 and which is expressly incorporated herein by reference in its entirety.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

According to the invention, not only the work can be positioned around the axis thereof with high accuracy but also an operation to position the work can be automated. This makes it possible to restrict an increase in the production cost of the work.

What is claimed is:

1. A phase adjusting method for holding a work with a recess formed around the axis of said work and for positioning said recess around said axis at a predetermined rotational angular position, said method comprising the steps of:

holding said work;

detecting an initial angular position of a detecting point of said work at which a contact sensor is brought in contact with said work;

rotating said work in a first direction until said detecting point reaches a first angular position;

reverse-rotating said work in a second direction opposite to said first direction until said detecting point reaches a second angular position;

calculating an detected angular position on the basis of first and second angular positions and then calculating a rotation angle corresponding to a difference between said initial angular position and said detected angular position; and adjusting a phase of said recess into a predetermined angular position by rotating said work around said axis in accordance with said rotation angle thus calculated.

2. The phase adjusting method according to claim 1, wherein said angular position is an averaged angular position of said first and second angular positions.

3. The phase adjusting method according to claim 1, further comprising the steps of:

supplemental sensing a detecting point of said work which is shifted by 180 degree so as to conduct the detecting step.

4. A recess machining method for manufacturing a work with recesses disposed in a circumferential direction at a predetermined interval, in a recess machining apparatus comprising a holding and rotating member by which a work can be held at any angular positions and said work can be rotated around its axis, a machining unit having a tool by which said recesses of said work can be finally machined, three dimensional drive unit for driving said machining unit in a X direction horizontally extended along the axis of said work, a Y direction vertically extended along a line perpendicular to said X direction and a Z direction horizontally extended along a line perpendicular to said X and Y directions, a table sensor detecting an angular position about the axis of said work, position sensors respectively detect positions of the machining unit in the X, Y and Z directions, a contact sensor provided with said tool while keeping a predetermined positional relationship between said contact sensor and said tool, and a phase controller for controlling and adjusting a positional relationship between said tool and an angular position of said recess, said recess machining method comprising the steps of:

bringing said contact sensor into contact with a detecting point of said work and then storing an initial angular position of said recess at this time, detecting said initial angular position of a detecting point of said work at which a contact sensor is brought in contact with said work rotating said work in a first direction by a first rotational angular distance and then storing a first data at this time, reverse-rotating said work in a second direction opposite to said first direction by a second rotational angular distance and then storing a second data at this time, calculating an detected angular position of said detecting point of the work on the basis of first and second data and then calculating a rotation angle corresponding to a difference between said initial angular position and said detected angular position, and adjusting said recess into said predetermined angular position by rotating said work around said axis in accordance with said rotation angle thus calculated.

5. The recess machining method according to claim 4, wherein said first data is a first angular position of said work, said second data is a second angular position of said work, and said phase controller calculates said rotation angle which corresponds to a difference between an averaged angular position of said first and second angular positions.

6. The recess machining method according to claim 5, wherein said work has a positional hole which is disposed apart from said recess by a predetermined distance, said first angular position is defined by an angle between a line which extends in the Z direction and contains said axis of said work and a line which is formed by connecting said axis of said work and a first contact position where the inner surface of said positional hole and said positional sensor are brought in contact with each other when said work rotates in the first direction, and said second angular position is defined by an angle between a line which extends in the Z direction and contains said axis of said work and a line which is formed by connecting said axis of said work and a second contact position where the inner surface of said positional hole and said positional sensor are brought in contact with each other when said work rotates in the second direction.

7. The recess machining method according to claim 4, further comprising the step of:

preliminary detecting a phase of said recess with a supplemental contact sensor which is provided with said contact sensor and disposed at a position apart from said contact sensor by an angle of 180 degree about said axis of said work.

8. The recess machining method according to claim 4, wherein
- each of said recesses is substantially formed into a symmetrical V-shape defined by first and second inclined lines in a cross-section,
- said first predetermined rotational angular distance is equal to said second predetermined rotational angular distance,
- said contact sensor is brought in contact with a detecting point of said work which is contained in its predetermined pitch circle,
- said first data is a first height of a first detecting point on said first inclined line, in the X direction detected by said X direction position sensor, said first detecting point being a point at which said first inclined line and said contact sensor are contacted with each other when said work is rotated in the first direction, and
- said second data is a second height of a second detecting point on said second inclined line, in the X direction detected by said X direction position sensor, said second detecting point being a point at which said second inclined line and said contact sensor are contacted with each other when said work is rotated in the second direction.

9. A recess machining method for manufacturing a work with recesses disposed in a circumferential direction at a predetermined interval, in a recess machining apparatus comprising a holding and rotating member by which a work can be held at any angular positions and said work can be rotated around its axis, a machining unit having a tool by which said recesses of said work can be finally machined, three dimensional drive unit for driving relatively said machining unit and said holding and rotating member in a X direction horizontally extended along the axis of said work, a Y direction vertically extended along a line perpendicular to said X direction and a Z direction horizontally extended along a line perpendicular to said X and Y directions, a table sensor detecting an angular position about the axis of said work, position sensors respectively detect positions of the machining unit in the X, Y and Z directions, a contact sensor provided with said tool while keeping a predetermined positional relationship between said contact sensor and said tool, and a phase controller for controlling and adjusting a positional relationship between said tool and an angular position of said recess, said recess machining method comprising the steps of:

- bringing said contact sensor into contact with a detecting point of said work and then storing an initial angular position of said recess at this time,
- detecting said initial angular position of a detecting point of said work at which a contact sensor is brought in contact with said work
- rotating said work in a first direction by a first rotational angular distance and then storing a first data at this time,
- reverse-rotating said work in a second direction opposite to said first direction by a second rotational angular distance and then storing a second data at this time,
- calculating an detected angular position of said detecting point of the work on the basis of first and second data and then calculating a rotation angle corresponding to a difference between said initial angular position and said detected angular position, and adjusting said recess into said predetermined angular position by rotating said work around said axis in accordance with said rotation angle thus calculated, wherein
- each of said recesses is substantially formed into a symmetrical V-shape defined by first and second inclined lines in a cross-section,
- said first predetermined rotational angular distance is equal to said second predetermined rotational angular distance,
- said contact sensor is brought in contact with a detecting point of said work which is contained in its predetermined pitch circle,
- said first data is a first height of a first detecting point on said first inclined line, in the X direction detected by said X direction position sensor, said first detecting point being a point at which said first inclined line and said contact sensor are contacted with each other when said work is rotated in the first direction, and
- said second data is a second height of a second detecting point on said second inclined line, in the X direction detected by said X direction position sensor, said second detecting point being a point at which said second inclined line and said contact sensor are contacted with each other when said work is rotated in the second direction, and
- said phase controller determines a reference angular position of said table sensor on the basis of said first predetermined rotation angular distance, said first data and said second data.

* * * * *